US012282947B2

(12) United States Patent
Nigul

(10) Patent No.: US 12,282,947 B2
(45) Date of Patent: Apr. 22, 2025

(54) METHOD, MEDIUM, AND SYSTEM FOR SYNCHRONIZING A RENDERING OF A PHYSICAL SPACE IN A VIRTUAL REALITY ENVIRONMENT WITH THE PHYSICAL SPACE

(71) Applicant: Maplebear Inc., San Francisco, CA (US)

(72) Inventor: Leho Nigul, Aurora (CA)

(73) Assignee: Maplebear Inc., San Francisco, CA (US)

( * ) Notice: Subject to any disclaimer, the term of this patent is extended or adjusted under 35 U.S.C. 154(b) by 274 days.

(21) Appl. No.: 17/730,632

(22) Filed: Apr. 27, 2022

(65) Prior Publication Data

US 2023/0351486 A1    Nov. 2, 2023

(51) Int. Cl.
*G06Q 30/00* (2023.01)
*G06Q 30/0601* (2023.01)
(Continued)

(52) U.S. Cl.
CPC ....... *G06Q 30/0643* (2013.01); *G06T 15/005* (2013.01); *G06T 19/006* (2013.01); *H04L 67/306* (2013.01)

(58) Field of Classification Search
CPC . G06Q 30/0643; G06T 15/005; G06T 19/006; H04L 67/306; G06F 3/011
See application file for complete search history.

(56) References Cited

U.S. PATENT DOCUMENTS 6,026,376 A * 2/2000 Kenney .............. G06Q 30/0623
705/26.61
9,940,589 B2 * 4/2018 Edwards ................. G06F 3/011
(Continued)

FOREIGN PATENT DOCUMENTS

CN    110020909 A  *  7/2019    ......... G06Q 30/0643
WO   WO-0169364 A2 *  9/2001    ........... G06F 3/0481

OTHER PUBLICATIONS

Virtual Reality in Retail: The Future of Shopping is Virtual. Sep. 27, 2019. Published via St Engineering Antycip. Accessed via https://steantycip.com/blog/future-of-retail-is-virtual/ (Year: 2019).*
(Continued)

*Primary Examiner* — Matthew E Zimmerman
(74) *Attorney, Agent, or Firm* — Fenwick & West LLP

(57) ABSTRACT

An online system receives information describing a physical retail store, in which the information includes attributes of physical elements within the store and their arrangement. A request is received from a user to generate a rendering of the store in a virtual reality environment. A profile of the user describing the user's geographic location and a set of historical actions performed by the user are accessed, in which the set of historical actions is associated with one or more of the physical elements. Based on the information describing the store and the profile, the rendering is generated to include virtual reality elements representing a set of the physical elements arranged based on the arrangement of the physical elements, and the rendering is sent for display to the user. When an update to the information describing the store is received, the rendering is updated and sent for display to the user.

16 Claims, 11 Drawing Sheets

(51) Int. Cl.
  *G06T 15/00* (2011.01)
  *G06T 19/00* (2011.01)
  *H04L 67/306* (2022.01)

(56) References Cited

U.S. PATENT DOCUMENTS

| | | | |
|---|---|---|---|
| 2007/0179867 A1 | 8/2007 | Glazer et al. | |
| 2010/0205043 A1* | 8/2010 | Edwards | G06Q 30/0201 |
| | | | 715/848 |
| 2012/0239536 A1* | 9/2012 | Takahashi | G06Q 30/06 |
| | | | 715/738 |
| 2014/0052550 A1* | 2/2014 | Glazer | G06Q 30/0641 |
| | | | 705/26.8 |
| 2016/0253745 A1* | 9/2016 | Lee | G06T 19/006 |
| | | | 705/27.2 |
| 2017/0358024 A1* | 12/2017 | Mattingly | G06F 3/041 |
| 2018/0300747 A1* | 10/2018 | Kuzyakov | G06Q 30/0243 |
| 2019/0236686 A1* | 8/2019 | Thompson | G06Q 30/0643 |
| 2019/0251622 A1* | 8/2019 | Wiedmeyer | G06Q 30/0643 |
| 2021/0374823 A1* | 12/2021 | Bronicki | G06Q 10/06315 |
| 2022/0236733 A1* | 7/2022 | Gupta | G01C 21/383 |
| 2022/0351281 A1* | 11/2022 | Morgan | G06Q 30/0631 |
| 2022/0374968 A1* | 11/2022 | Berger | G06Q 30/0643 |
| 2022/0383396 A1* | 12/2022 | Haapoja | G06Q 30/0639 |

OTHER PUBLICATIONS

PCT International Search Report and Written Opinion, PCT Application No. PCT/US22/48864, Feb. 14, 2023, 7 pages.

\* cited by examiner

METHOD, MEDIUM, AND SYSTEM FOR SYNCHRONIZING A RENDERING OF A PHYSICAL SPACE IN A VIRTUAL REALITY ENVIRONMENT WITH THE PHYSICAL SPACE

BACKGROUND

This disclosure relates generally to rendering a physical element in a virtual reality environment and more specifically to synchronizing a rendering of a physical retail store in a virtual reality environment with a physical retail store. Conventionally, virtual reality environments, which are simulated digital environments, provide users with opportunities to explore and interact with the environments in ways that mimic real-world interactions (e.g., by shopping, playing games, etc.). Users may access virtual reality environments through devices, such as virtual reality headsets, that make these interactions richer and more immersive. Recently, virtual reality environments have become more popular as they become more integrated with society. For example, users may access a three-dimensional virtual reality environment and purchase land rendered in the environment. In this example, once purchased, the land may be developed into housing that may be sold or rented to other users within the virtual reality environment or into commercial buildings that may offer goods or services for sale to the other users. As an additional example, a user may invest in digital art rendered in a virtual reality environment, which the user may later sell for a profit if it appreciates in value in the virtual reality environment. Furthermore, the popularity of virtual reality environments has also grown as they have become easier to access (e.g., as virtual reality headsets have become more affordable and more applications that may be used to access them have been developed).

However, since the appeal of virtual reality environments is largely based on their ability to mimic real-world interactions, users may not interact with the environments as much as they otherwise would if the environments are not updated to match the real-life environments they mimic. For example, suppose that a theme park is decorated during holiday seasons with holiday-themed decorations. In this example, if users who access a virtual reality environment during a holiday season expect to see holiday decorations in the rendering of the theme park, they may be disappointed if the rendering has not been updated with holiday decorations that match those at the real-life theme park and may decide to exit the virtual reality environment. As an additional example, suppose that a new model of car has recently become available for purchase at real-life car dealerships. In this example, users who wish to purchase the same model of car in a virtual reality environment may be disappointed if the virtual reality environment has not been updated to provide the model of car for sale at car dealerships in the virtual reality environment and may therefore refrain from accessing the virtual reality environment.

SUMMARY

Conventionally, virtual reality environments provide users with opportunities to explore and interact with the environments that mimic real-world interactions. Virtual reality environments have increased in popularity as they become more integrated with society and as they have become easier to access. However, users may not find virtual reality environments as appealing, and hence may not interact with the environments as much as they otherwise would, if the environments are not updated to match the real-life environments they mimic.

In accordance with one or more aspects of the disclosure, an online system synchronizes a rendering of a physical retail store in a virtual reality environment with the physical retail store (as it exists in real life). More specifically, the online system receives information describing a physical retail store, in which the information includes attributes of physical elements within the store and their arrangement within the store. A request is then received from a user of the online system to generate a rendering of the store in a virtual reality environment. The online system accesses a user profile of the user describing the user's geographic location and a set of historical actions performed by the user, in which the set of historical actions is associated with one or more of the physical elements. Based in part on the information describing the store and the user profile, the rendering of the store is generated, in which the rendering includes virtual reality elements representing a set of the physical elements, and the virtual reality elements are arranged based in part on the arrangement of the physical elements within the store. The rendering is then sent for display to the user. When an update to the information describing the store is received, the rendering is updated based in part on this information and sent for display to the user.

The figures depict embodiments of the present disclosure for purposes of illustration only. Alternative embodiments of the structures and methods illustrated herein may be employed without departing from the principles, or benefits touted, of the disclosure described herein.

DETAILED DESCRIPTION

System Architecture

Figure 1:
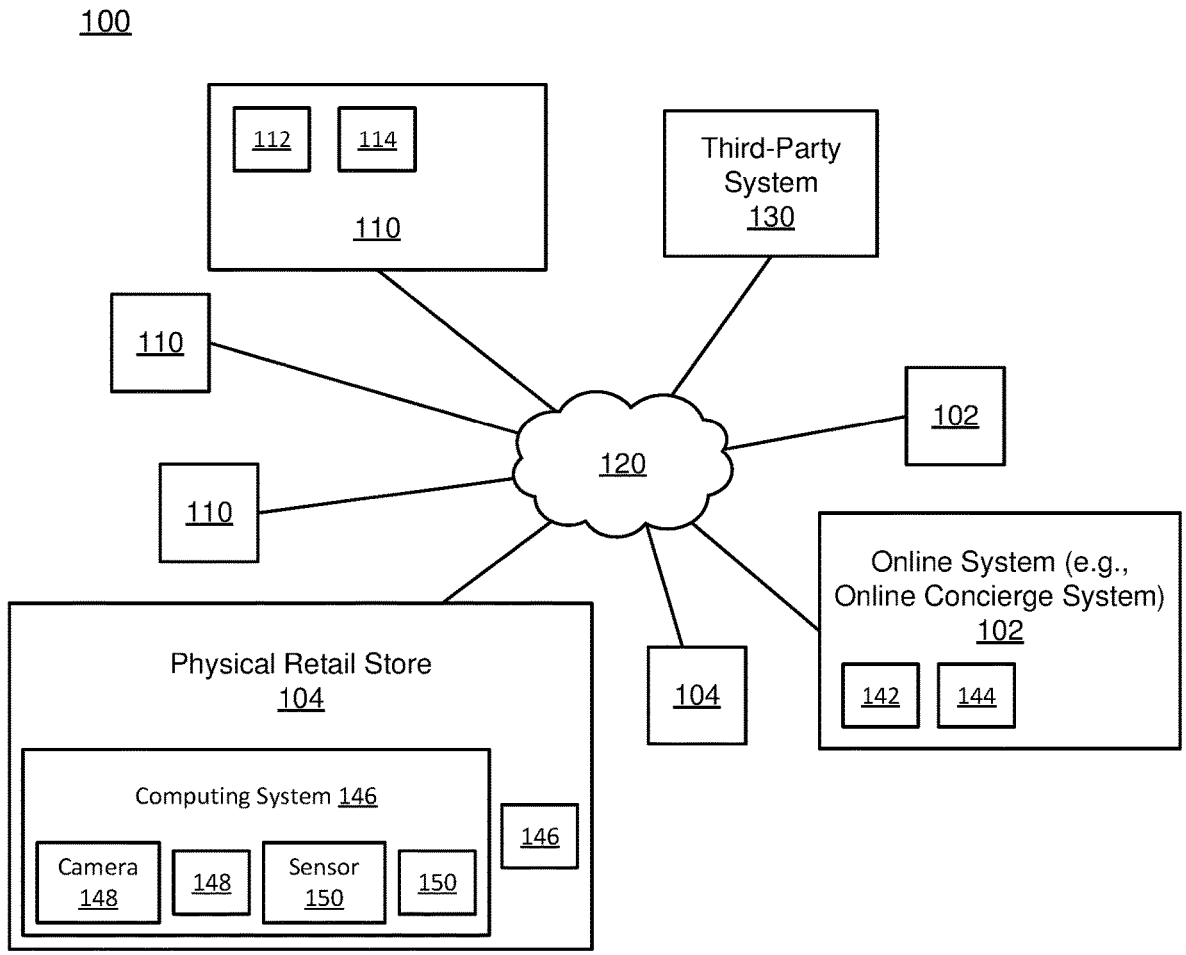
FIG. 1 is a block diagram of a system environment in which one or more online systems operate, in accordance with one or more illustrative aspects of the disclosure.

FIG. 1 is a block diagram of a system environment 100 in which one or more online systems (e.g., social networking systems and/or online concierge systems) 102 as further described below in conjunction with FIGS. 2, 3A, and 3B, operate. The system environment 100 shown in FIG. 1 comprises one or more client devices 110, a network 120, one or more third-party systems 130, one or more physical retail stores 104, and one or more online systems 102. In alternative configurations, different and/or additional components may be included in the system environment 100. Additionally, in other embodiments, an online system 102 may be configured to retrieve content for display to users and to transmit the content to one or more client devices 110 for display.

The client devices 110 are one or more computing devices capable of receiving user input as well as transmitting and/or receiving data via the network 120. In one embodiment, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with an online system 102. For example, the client device 110 executes a customer mobile application 206 or a shopper mobile application 212, as further described below in conjunction with FIG. 2, to enable interaction between the client device 110 and an online system (e.g., an online concierge system) 102. As an additional example, a client device 110 executes a browser application to enable interaction between the client device 110 and the online system(s) 102 via the network 120. In another embodiment, a client device 110 interacts with the online system(s) 102 through an application programming interface (API) running on a native operating system of the client device 110, such as IOS® or ANDROID™.

A client device 110 includes one or more processors 112 configured to control operation of the client device 110 by performing various functions. In various embodiments, a client device 110 includes a memory 114 comprising a non-transitory storage medium on which instructions are encoded. The memory 114 may have instructions encoded thereon that, when executed by the processor 112, cause the processor 112 to perform functions to execute the customer mobile application 206 or the shopper mobile application 212 to provide the functions further described below in conjunction with FIG. 2.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system(s) 102, the client device(s) 110, or the physical retail store(s) 104. In one embodiment, a third-party system 130 is an application provider communicating information describing applications for execution by a client device 110 or communicating data to client devices 110 for use by an application executing on the client device 110. In other embodiments, a third-party system 130 provides content or other information for presentation via a client device 110. For example, a third-party system 130 stores one or more web pages and transmits the web pages to a client device 110 or to the online system(s) 102. A third-party system 130 may also communicate information to the online system(s) 102, such as advertisements, content, or information about an application provided by the third-party system 130.

An online system 102 includes one or more processors 142 configured to control operation of the online system 102 by performing various functions. In various embodiments, an online system 102 includes a memory 144 comprising a non-transitory storage medium on which instructions are encoded. The memory 144 may have instructions encoded thereon corresponding to the modules further described below in conjunction with FIGS. 3A and 3B that, when executed by the processor 142, cause the processor 142 to perform the functionality further described below in conjunction with FIGS. 2 and FIGS. 4A-6D. For example, the memory 144 has instructions encoded thereon that, when executed by the processor 142, cause the processor 142 to synchronize a rendering of a physical retail store 104 in a virtual reality environment with the physical retail store 104. Additionally, an online system 102 includes a communication interface configured to connect the online system 102 to one or more networks, such as network 120, or to otherwise communicate with devices (e.g., client devices 110) connected to the network(s).

One or more physical retail stores 104 may be coupled to the network 120 for communicating with the online system(s) 102, the client device(s) 110, or the third-party system(s) 130. A physical retail store 104 may include one or more computing systems 146 capable of collecting information as well as transmitting and/or receiving data via the network 120. In one embodiment, a physical retail store 104 (e.g., a physical grocery store) communicates information describing the physical retail store 104, including information describing attributes of physical elements within the physical retail store 104 and an arrangement of the physical elements within the physical retail store 104. This information may then be used to generate a rendering of the physical retail store 104 (e.g., in a virtual reality environment), as further described below.

Each computing system 146 within a physical retail store 104 may include various components for collecting information describing the physical retail store 104. In some embodiments, these components include one or more cameras 148 (e.g., video cameras 148 or digital cameras 148 that capture still images) and/or one or more sensors 150 capable of collecting information describing attributes of physical elements within the physical retail store 104 and an arrangement of the physical elements within the physical retail store 104. The cameras 148 may have various capabilities to help identify physical elements captured in the video feed and their attributes, such as face detection, text detection, infrared detection, night vision, motion activation, etc., as well as their arrangement within a physical retail store 104. For example, multiple cameras 148 on a shopping cart within a physical retail store 104 may capture video feeds of physical elements within the physical retail store 104 and their arrangement within the physical retail store 104 as a shopper using the shopping cart moves throughout the physical retail store 104. The sensors 150 may detect location information (e.g., GPS coordinates), motion, proximity/distance, wavelengths (e.g., visible light, infrared light, etc.), colors, sound, speed, weight, vibration, etc. In the above example, a GPS sensor 150 and proximity sensors 150 (e.g., laser or ultrasonic proximity sensors 150) on the shopping cart may collect additional information describing the arrangement of the physical elements within the physical retail store 104. In this example, information describing an arrangement of physical elements within the physical retail store 104 may include GPS coordinates associated with the shopping cart and a distance (e.g., in feet or meters), a direction (e.g., north, south, east, or west), and an altitude (e.g., in feet or meters) of each physical element relative to one or more proximity sensors 150 on the shopping cart.

In some embodiments, components that collect information describing a physical retail store 104 also may include one or more client devices 110. For example, suppose that a shopper at a physical retail store 104 is using a camera application on their client device 110 while the client device 110 is connected to a free Wi-Fi service offered by the physical retail store 104 and the shopper has allowed the physical retail store 104 to access a camera and a microphone on the client device 110. In this example, the camera and the microphone of the client device 110 may collect video and audio data that is communicated to a computing system 146 within the physical retail store 104.

Information collected by components of each computing system 146 within a physical retail store 104 may be associated with various types of data. Examples of data associated with the information include a name of the physical retail store 104, a geographic location associated with the physical retail store 104, a time at which the information was collected at the physical retail store 104, etc. For example, if a physical retail store 104 is a grocery store that belongs to a chain of grocery stores, video feeds collected by cameras 148 in the physical retail store 104 and readings collected by sensors 150 in the physical retail store 104 may be associated with data including a name that identifies the chain and a geographic location (e.g., city and state) that identifies the specific physical retail store 104. In the above example, each frame of the video feed and reading collected by the sensors 150 may also be associated with a timestamp indicating a time at which it was captured/collected.

Although not illustrated in FIG. 1, in some embodiments, one or more computing systems 146 within the physical retail store(s) 104 include(s) one or more processors configured to control operation of the computing system(s) 146 by performing various functions. In various embodiments, each computing system 146 also includes a memory comprising a non-transitory storage medium on which instructions are encoded. The memory may have instructions encoded thereon corresponding to some of the modules further described below in conjunction with FIGS. 3A and 3B that, when executed by the processor, cause the processor to perform some of the functionality further described below in conjunction with FIGS. 2 and FIGS. 4A-6D.

One or more of a client device 110, a third-party system 130, an online system 102, or a computing system 146 may be special-purpose computing devices configured to perform specific functions, as further described below in conjunction with FIGS. 2-6D, and may include specific computing components such as processors, memories, communication interfaces, and/or the like.

System Overview

Figure 2:
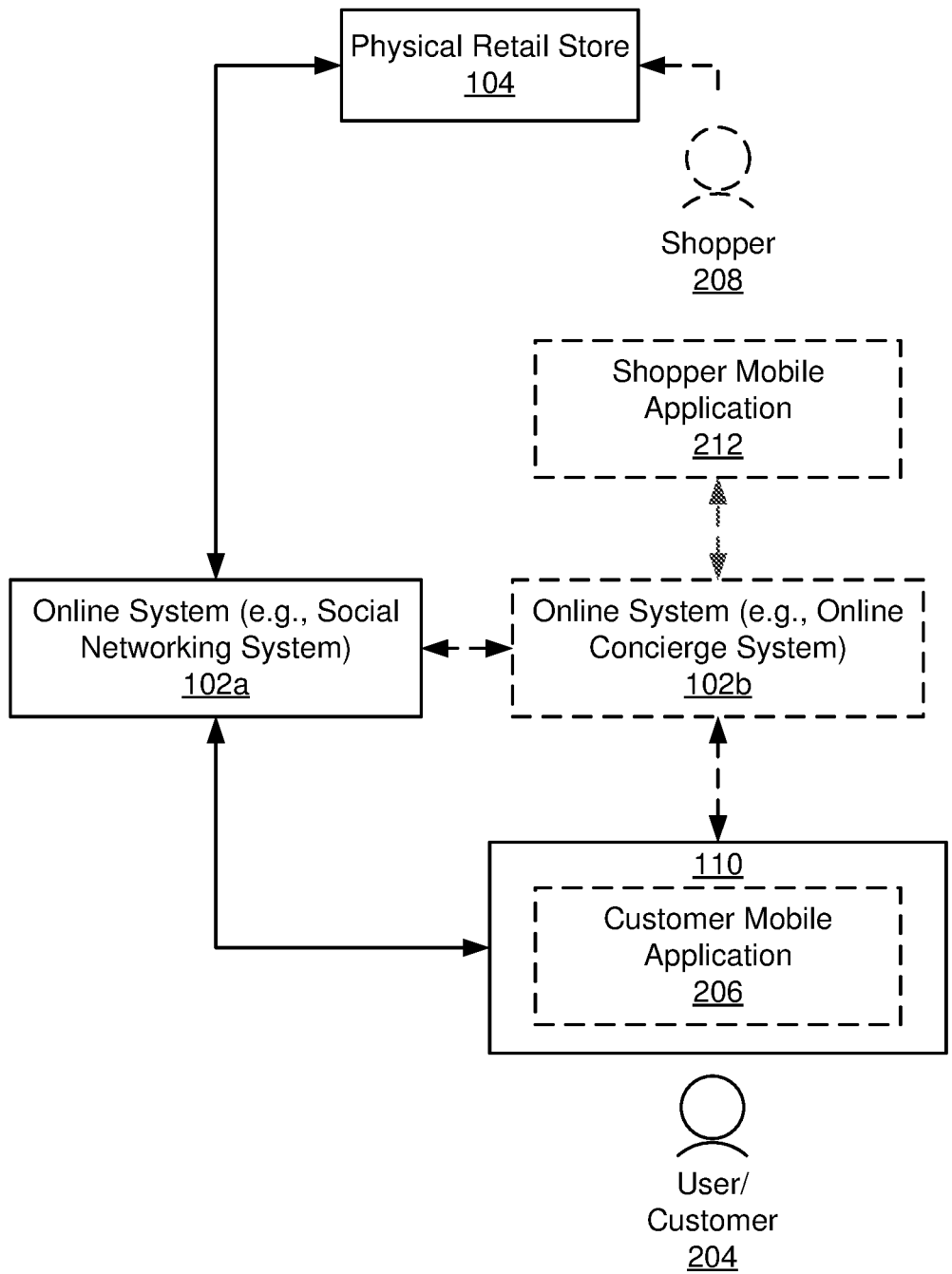
FIG. 2 illustrates an environment of one or more online systems, in accordance with one or more illustrative aspects of the disclosure.

FIG. 2 illustrates an environment 200 of one or more online systems 102, according to various embodiments. The figures use like reference numerals to identify like elements. A letter after a reference numeral, such as "102a," indicates that the text refers specifically to the element having that particular reference numeral. A reference numeral in the text that is not followed by a letter, such as "102," refers to any or all of the elements in the figures bearing that reference numeral. For example, "102" in the text may refer to reference numerals "102a," and/or "102b" in the figures.

The environment 200 includes one or more online systems (e.g., a social networking system and/or an online concierge system) 102. The online system(s) 102 may be configured to receive requests from one or more users/customers 204 (only one is shown for the sake of simplicity) of the online system(s) 102 to generate a rendering of a physical retail store 104 (e.g., in a virtual reality environment). A rendering of a physical retail store 104 may include elements (e.g., virtual reality elements) representing physical elements within the physical retail store 104 that are arranged based in part on the arrangement of the physical elements within the physical retail store 104. In some embodiments, the online system(s) 102 also or alternatively may be configured to receive orders from the user(s)/customer(s) 204. An order specifies a list of goods (items or products) to be delivered to a user/customer 204, a location to which the goods are to be delivered, and a time window during which the goods should be delivered. In some embodiments, an order specifies one or more retailers from which goods should be purchased. A user/customer 204 may use the customer mobile application 206, which is configured to communicate with the online system(s) 102, to place an order.

An online system (e.g., an online concierge system) 102 may be configured to transmit orders received from users/customers 204 to one or more shoppers 208. A shopper 208 may be a person (e.g., a contractor, an employee, etc.), an entity, or an autonomous device (e.g., a robot) enabled to fulfill orders received by the online system(s) 102. A shopper 208 travels between a physical retail store 104 and a delivery location (e.g., a customer's home or office) and may do so by car, truck, bicycle, scooter, foot, or via any other mode of transportation. In some embodiments, a delivery may be partially or fully automated, e.g., using a self-driving car. The environment 200 also includes one or more physical retail stores 104 (while only one is shown for the sake of simplicity, the environment 200 may include hundreds of physical retail stores 104). The physical retail stores 104 may be physical retailers, such as grocery stores, discount stores, department stores, etc., or non-public physical retail stores 104 storing items that may be collected and delivered to users/customers 204. Each shopper 208 fulfills an order received from an online system 102 at one or more physical retail stores 104, delivers the order to a user/customer 204, or performs both fulfillment and delivery. In one embodiment, shoppers 208 make use of a shopper mobile application 212 which is configured to interact with an online system 102.

In some embodiments, a first online system (e.g., a social networking system) 102a is configured to receive requests from one or more users 204 of the first online system 102a to generate a rendering of a physical retail store 104 (e.g., in a virtual reality environment), while a second online system (e.g., an online concierge system) 102b is configured to receive orders from one or more customers 204 of the second online system 102b to be fulfilled at one or more physical retail stores 104. In such embodiments, one or more customers 204 of the second online system 102b are also users 204 of the first online system 102a. Furthermore, in such embodiments, the first online system 102a is configured to access information maintained in the second online system 102b included in a user profile of a user/customer 204, which is further described below.

Figure 3A:
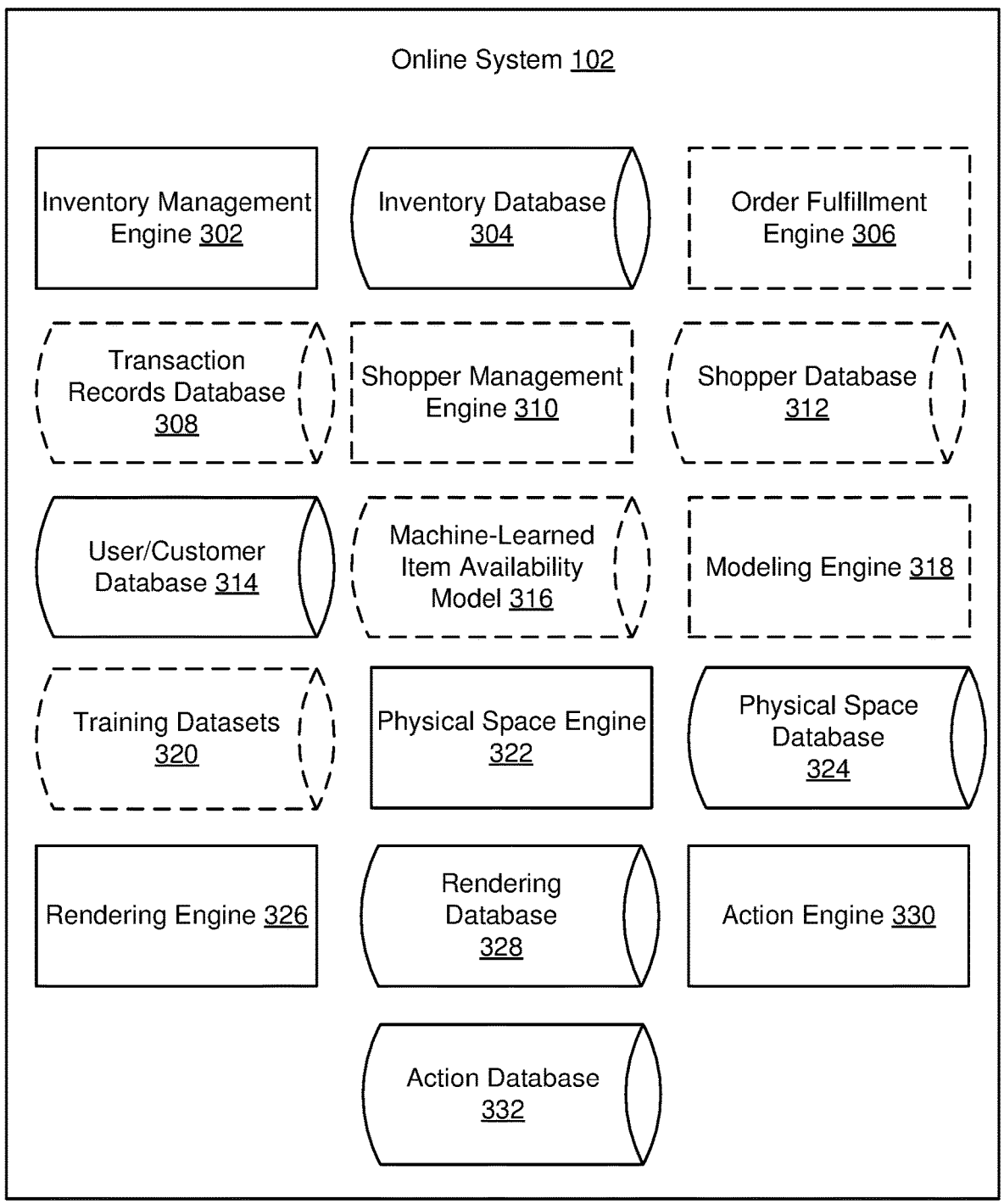
FIG. 3A is a diagram of an online system, in accordance with one or more illustrative aspects of the disclosure.

FIG. 3A is a diagram of an online system 102, in accordance with one or more illustrative aspects of the disclosure. In various embodiments, the online system 102 may include different or additional modules than those described in conjunction with FIG. 3A. Furthermore, in some embodiments, the online system 102 includes fewer modules than those described in conjunction with FIG. 3A.

The online system 102 includes an inventory management engine 302, which interacts with inventory systems associated with each physical retail store 104. In one embodiment, the inventory management engine 302 requests and receives inventory information maintained by a physical retail store 104. The inventory management engine 302 also may receive inventory information from one or more computing systems 146 included in a physical retail store 104 (e.g., information collected by cameras 148, sensors 150, etc.). The inventory of each physical retail store 104 is unique and may change over time. The inventory management engine 302 monitors changes in inventory for each participating physical retail store 104. The inventory management engine 302 is also configured to store inventory records in an inventory database 304. The inventory database 304 may store information in separate records—one for each participating physical retail store 104—or may consolidate or combine inventory information into a unified record. Inventory information includes attributes of items that include both qualitative and quantitative information about the items, including size, color, weight, SKU, serial number, etc. In one embodiment, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-store combination (a particular item at a particular physical retail store 104), the inventory database 304 may store a time that the item was last found, a time that the item was last not found (e.g., if a shopper 208 looked for the item but could not find it), a rate at which the item is found, and a popularity of the item.

For each item, the inventory database 304 identifies one or more attributes of the item and corresponding values for each attribute of the item. For example, the inventory database 304 includes an entry for each item offered by a physical retail store 104, in which an entry for an item includes an item identifier that uniquely identifies the item. The entry includes different fields, with each field corresponding to an attribute of the item. A field of an entry includes a value for an attribute corresponding to the field, allowing the inventory database 304 to maintain values of different attributes for various items.

In various embodiments, the inventory management engine 302 maintains a taxonomy of items offered for purchase by one or more physical retail stores 104. For example, the inventory management engine 302 receives an item catalog from a physical retail store 104 identifying items offered for purchase by the physical retail store 104. From the item catalog, the inventory management engine 302 determines a taxonomy of items offered by the physical retail store 104, in which different levels of the taxonomy provide different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.) with the category. Thus, the taxonomy maintains associations between a category and specific items offered by the physical retail store 104 matching the category. In some embodiments, different levels of the taxonomy identify items with differing levels of specificity based on any suitable attribute or combination of attributes of the items. For example, different levels of the taxonomy specify different combinations of attributes of items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels of the taxonomy include fewer details about items, so greater numbers of items are included in higher levels (e.g., higher levels include a greater number of items satisfying a broader category). Similarly, lower levels of the taxonomy include greater details about items, so fewer numbers of items are included in the lower levels (e.g., lower levels include a fewer number of items satisfying a more specific category). The taxonomy may be received from a physical retail store 104 in various embodiments. In other embodiments, the inventory management engine 302 applies a trained classification model to an item catalog received from a physical retail store 104 to include different items in levels of the taxonomy, so application of the trained classification model associates specific items with categories corresponding to levels within the taxonomy.

Inventory information provided by the inventory management engine 302 may supplement training datasets 320. Inventory information provided by the inventory management engine 302 may not necessarily include information about the outcome of fulfilling a delivery order associated with the item, whereas the data within the training datasets 320 is structured to include an outcome of fulfilling a delivery order (e.g., if an item in an order was or was not collected).

In some embodiments, the online system 102 includes an order fulfillment engine 306 which is configured to synthesize and display an ordering interface to each user/customer 204 (for example, via the customer mobile application 206). The order fulfillment engine 306 is also configured to access the inventory database 304 in order to determine which items are available at which physical retail store 104. The order fulfillment engine 306 may supplement the item availability information from the inventory database 304 with item availability information predicted by a machine-learned item availability model 316. The order fulfillment engine 306 determines a sale price for each item ordered by a user/customer 204. Prices set by the order fulfillment engine 306 may or may not be identical to in-store prices determined by retailers (which is the price that users/customers 204 and shoppers 208 would pay at the physical retail stores 104). The order fulfillment engine 306 also facilitates transactions associated with each order. In one embodiment, the order fulfillment engine 306 charges a payment instrument associated with a user/customer 204 when he/she places an order. The order fulfillment engine 306 may transmit payment information to an external payment gateway or payment processor. The order fulfillment engine 306 stores payment and transactional information associated with each order in a transaction records database 308, which is included in the online system 102 in some embodiments.

In various embodiments, the order fulfillment engine 306 generates and transmits a search interface to a client device 110 of a user/customer 204 for display via the customer mobile application 206. The order fulfillment engine 306 receives a query comprising one or more terms from a user/customer 204 and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with physical retail stores 104. For example, after successful fulfillment of an order, the order fulfillment engine 306 may transmit a summary of the order to the appropriate physical retail stores 104. Details of an order may indicate the items purchased, a total value of the items, and in some cases, an identity of a shopper 208 and a user/customer 204 associated with the order. In one embodiment, the order fulfillment engine 306 pushes transaction and/or order details asynchronously to retailer systems. This may be accomplished via the use of webhooks, which enable programmatic or system-driven transmission of information between web applications. In another embodiment, retailer systems may be configured to periodically poll the order fulfillment engine 306, which provides details of all orders which have been processed since the last request.

In various embodiments, the order fulfillment engine 306 may access information in the action database 332 describing items represented by elements (e.g., virtual reality elements) that a user/customer 204 placed into another element representing a shopping cart, a shopping basket, a shopping list, etc. while accessing an environment (e.g., a virtual reality environment). The order fulfillment engine 306 may access this information upon receiving a request from the user/customer 204 to place an order for the items. The order fulfillment engine 306 then facilitates transactions associated with the order as described above (e.g., by charging a payment instrument, storing payment and transactional information associated with the order in the transaction records database 308, etc.). In some embodiments, the order fulfillment engine 306 communicates information identifying a physical retail store 104 in association with a new order to a shopper management engine 310 (described below). The order fulfillment engine 306 may do so if the physical retail store 104 is rendered in an environment (e.g., a virtual reality environment) in which a user/customer 204 requested to purchase elements representing items sold by the physical retail store 104.

In some embodiments, the online system 102 includes the shopper management engine 310. The order fulfillment engine 306 may interact with the shopper management engine 310, which manages communication with and utilization of shoppers 208. In one embodiment, the shopper management engine 310 receives a new order from the order fulfillment engine 306. The shopper management engine 310 identifies the appropriate physical retail store 104 to fulfill the order based on one or more parameters, such as a probability of item availability determined by the machine-learned item availability model 316, the contents of the order, the inventory of the physical retail stores 104, and the proximity of the physical retail stores 104 to the delivery location. In embodiments in which the shopper management engine 310 receives information from the order fulfillment engine 306 identifying a physical retail store 104 in association with a new order, the shopper management engine 310 may identify the physical retail store 104 as the appropriate physical retail store 104 to fulfill the order. The shopper management engine 310 then identifies one or more appropriate shoppers 208 to fulfill the order based on one or more parameters, such as the shoppers' proximity to the appropriate physical retail store 104 (and/or to the user/customer 204), his/her familiarity level with that particular physical retail store 104, etc. Additionally, the shopper management engine 310 accesses a shopper database 312 which stores information describing each shopper 208, such as his/her name, gender, rating, previous shopping history, etc.

As part of fulfilling an order, the order fulfillment engine 306 and/or shopper management engine 310 may access a user/customer database 314, which stores information describing each user/customer 204. In some embodiments, information stored in the user/customer database 314 describing each user/customer 204 is included in a user profile of the user/customer 204. This information may include each customer's name, geographic location (e.g., home or business address), gender, shopping preferences, favorite items, stored payment instruments, profile picture, etc. In addition to the information described above, in some embodiments, the user/customer database 314 also includes information describing historical actions performed by users/customers 204 associated with various physical elements within one or more physical retail stores 104. Examples of information describing actions performed by a user/customer 204 associated with physical elements within a physical retail store 104 include placing orders including items corresponding to the physical elements, interacting with the physical elements within a physical retail store 104, interacting with virtual reality elements representing the physical elements in a virtual reality environment, etc. For example, actions performed by a user/customer 204 associated with physical elements within a physical retail store 104 may include placing orders using the online system 102, in which the orders include items corresponding to the physical elements, reviewing the items in the online system 102, etc. In the above example, additional actions also may include sampling items corresponding to the physical elements while at the physical retail store 104 or, while accessing a rendering of the physical retail store 104 in a virtual reality environment, placing virtual reality elements representing the physical elements into a virtual reality element representing a shopping cart.

In some embodiments, information describing historical actions performed by a user/customer 204 also or alternatively may be stored in multiple databases and/or across multiple online systems 102, as further described below. For example, information describing historical actions performed by a user/customer 204 also may be stored in the transaction records database 308, the training datasets 320, and/or the action database 332. In such embodiments, the information describing the historical actions included in a user profile of the user/customer 204 may be identified based on information associated with the historical actions identifying the user/customer 204 (e.g., a username or other identifier of the user/customer 204).

In various embodiments, the order fulfillment engine 306 determines whether to delay display of a received order to shoppers 208 for fulfillment by a time interval. In response to determining to delay display of the received order by a time interval, the order fulfillment engine 306 evaluates subsequent orders received during the time interval for inclusion in one or more batches that also include the received order. After the time interval, the order fulfillment engine 306 displays the order to one or more shoppers 208 via the shopper mobile application 212; if the order fulfillment engine 306 generated one or more batches including the received order and one or more subsequent orders received during the time interval, the batch(es) is/are also displayed to one or more shoppers 208 via the shopper mobile application 212.

Machine Learning Models

In some embodiments, the online system 102 further includes the machine-learned item availability model 316, a modeling engine 318, and the training datasets 320. The modeling engine 318 uses the training datasets 320 to generate the machine-learned item availability model 316. The machine-learned item availability model 316 may learn from the training datasets 320, rather than follow only explicitly programmed instructions. The inventory management engine 302, order fulfillment engine 306, and/or shopper management engine 310 may use the machine-learned item availability model 316 to determine a probability that an item is available at a physical retail store 104. The machine-learned item availability model 316 may be used to predict item availability for items being displayed to or selected by a user/customer 204 or included in received delivery orders. A single machine-learned item availability model 316 is used to predict the availability of any number of items.

The machine-learned item availability model 316 may be configured to receive, as inputs, information about an item, a physical retail store 104 for collecting the item, and a time for collecting the item. The machine-learned item availability model 316 may be adapted to receive any information that the modeling engine 318 identifies as an indicator of item availability. At a minimum, the machine-learned item availability model 316 receives information about an item-store pair, such as an item in a delivery order and a physical retail store 104 at which the order may be fulfilled. Items stored in the inventory database 304 may be identified by item identifiers. As described above, various characteristics, some of which are specific to a physical retail store 104 (e.g., a time that an item was last found in the physical retail store 104, a time that the item was last not found in the physical retail store 104, a rate at which the item is found, a popularity of the item, etc.) may be stored for each item in the inventory database 304. Similarly, each physical retail store 104 may be identified by a physical retail store identifier and stored in a physical retail store database along with information about the physical retail store 104. A particular item at a particular physical retail store 104 may be identified using an item identifier and a physical retail store identifier. In other embodiments, the item identifier refers to a particular item at a particular physical retail store 104, so that the same item at two different physical retail stores 104 is associated with two different identifiers. For convenience, both of these options to identify an item at a physical retail store 104 are referred to herein as an "item-store pair." Based on the identifier(s), the online system 102 may extract information about the item and/or physical retail store 104 from the inventory database 304 and/or physical retail store database and provide this extracted information as inputs to the machine-learned item availability model 316.

The machine-learned item availability model 316 contains a set of functions generated by the modeling engine 318 from the training datasets 320 that relate an item, a physical retail store 104, timing information, and/or any other relevant inputs, to a probability that the item is available at the physical retail store 104. Thus, for a given item-store pair, the machine-learned item availability model 316 outputs a probability that the item is available at the physical retail store 104. The machine-learned item availability model 316 constructs a relationship between the item-store pair, the timing information, and/or any other inputs and the probability of availability (also referred to as "availability") that is generic enough to apply to any number of different item-store pairs. In some embodiments, the probability output by the machine-learned item availability model 316 includes a confidence score. The confidence score may be the error or uncertainty score of the probability of availability and may be calculated using any standard statistical error measurement. In some embodiments, the confidence score is based in part on whether the item-store pair availability prediction was accurate for previous delivery orders (e.g., if an item was predicted to be available at a physical retail store 104 and was not found by a shopper 208 or was predicted to be unavailable but was found by the shopper 208). In various embodiments, the confidence score is based in part on the age of the data for the item (e.g., if availability information has been received within the past hour or the past day). The set of functions of the machine-learned item availability model 316 may be updated and adapted following retraining with new training datasets 320. The machine-learned item availability model 316 may be any machine learning model, such as a neural network, a boosted tree, a gradient-boosted tree, or a random forest model. In some embodiments, the machine-learned item availability model 316 is generated from the XGBoost algorithm. The probability of availability of an item generated by the machine-learned item availability model 316 may be used to determine instructions delivered to a user/customer 204 and/or shopper 208, as described in further detail below.

The training datasets 320 relate a variety of different factors to known item availabilities from the outcomes of previous delivery orders (e.g., if an item was previously found or previously unavailable). The training datasets 320 include items included in previous delivery orders, whether the items in the previous delivery orders were collected, physical retail stores 104 associated with the previous delivery orders, and a variety of characteristics associated with each of the items, which may be obtained from the inventory database 304. Each piece of data in the training datasets 320 includes an outcome of a previous delivery order (e.g., whether an item was collected). Item characteristics may be determined by the machine-learned item availability model 316 to be statistically significant factors predictive of an item's availability. Item characteristics that are predictors of availability may be different for different items. For example, an item type factor might be the best predictor of availability for dairy items, whereas a time of day may be the best predictive factor of availability for vegetables. For each item, the machine-learned item availability model 316 may weight these factors differently, in which the weights are a result of a "learning" or a training process on the training datasets 320. The training datasets 320 are very large datasets taken across a wide cross section of physical retail stores 104, shoppers 208, items, delivery orders, times, and item characteristics. The training datasets 320 are large enough to provide a mapping from an item in an order to a probability that the item is available at a physical retail store 104. In addition to previous delivery orders, the training datasets 320 may be supplemented by inventory information provided by the inventory management engine 302. In some embodiments, the training datasets 320 are historical delivery order information used to train the machine-learned item availability model 316, whereas the inventory information stored in the inventory database 304 includes factors input into the machine-learned item availability model 316 to determine an item availability for an item in a newly received delivery order. In various embodiments, the modeling engine 318 may evaluate the training datasets 320 to compare a single item's availability across multiple physical retail stores 104 to determine if an item is chronically unavailable, which may indicate that the item is no longer manufactured. The modeling engine 318 may query a physical retail store 104 through the inventory management engine 302 for updated item information about any such items.

Machine Learning Factors

The training datasets 320 include times associated with previous delivery orders. In some embodiments, the training datasets 320 include a time of day at which each previous delivery order was placed. Item availability may be impacted by time of day since items that are otherwise regularly stocked by physical retail stores 104 may become unavailable during high-volume shopping times. In addition, item availability may be affected by restocking schedules. For example, if a physical retail store 104 mainly restocks items at night, item availability at the physical retail store 104 will tend to decrease over the course of the day. Additionally, or alternatively, the training datasets 320 include a day of the week that previous delivery orders were placed. The day of the week may impact item availability since physical retail stores 104 may have reduced item inventory on popular shopping days and restocking shipments may be received on particular days. In some embodiments, the training datasets 320 include a time interval since an item was previously collected for a previous delivery order. If an item has recently been collected at a physical retail store 104, this may increase the probability that it is still available. If a long interval of time has elapsed since an item has been collected, this may indicate that the probability that the item is available for subsequent orders is low or uncertain. In some embodiments, the training datasets 320 include a time interval since an item in a previous delivery order was not found. If a short interval of time has elapsed since an item was not found, this may indicate that there is a low probability that the item will be available for subsequent delivery orders. Conversely, if a long interval of time has elapsed since an item was not found, this may indicate that the item may have been restocked and will be available for subsequent delivery orders. In some embodiments, the training datasets 320 may also include a rate at which an item is typically found by a shopper 208 at a physical retail store 104, a number of days since inventory information about the item was last received from the inventory management engine 302, a number of times the item was not found during a previous week, or any number of additional rate-related or time-related information. Relationships between this rate-related and/or time-related information and item availability are determined by the modeling engine 318, which trains a machine learning model with the training datasets 320, producing the machine-learned item availability model 316.

The training datasets 320 include item characteristics. In some embodiments, the item characteristics include a department associated with an item. For example, if an item is yogurt, it is associated with a dairy department. Examples of departments include bakery, beverage, nonfood, pharmacy, produce, floral, deli, prepared foods, meat, seafood, dairy, or any other categorization of items used by a physical retail store 104. A department associated with an item may affect item availability, since different departments have different item turnover rates and inventory levels. In some embodiments, the item characteristics include an aisle of a physical retail store 104 associated with an item. The aisle of the physical retail store 104 may affect item availability since different aisles of a physical retail store 104 may be re-stocked more frequently than others. Additionally, or alternatively, the item characteristics may include an item popularity score. The item popularity score for an item may be proportional to the number of delivery orders received that include the item. An alternative or additional item popularity score may be provided by a retailer through the inventory management engine 302. In some embodiments, the item characteristics include a product type associated with an item. For example, if an item is a particular brand of a product, the product type will be a generic description of the product type, such as "milk" or "eggs." The product type may affect item availability since certain product types may have higher turnover and re-stocking rates than others or may have larger inventories in the physical retail stores 104. In some embodiments, the item characteristics may include a number of times a shopper 208 was instructed to keep looking for an item after he or she was initially unable to find the item, a total number of delivery orders received for an item, whether or not an item is organic, vegan, gluten free, or any other characteristics associated with an item. The relationships between item characteristics and item availability are determined by the modeling engine 318, which trains a machine learning model with the training datasets 320, producing the machine-learned item availability model 316.

The training datasets 320 may include additional item characteristics that affect item availability and may therefore be used to build the machine-learned item availability model 316 relating a delivery order including an item to the item's predicted availability. The training datasets 320 may be periodically updated with recent delivery orders. The training datasets 320 may be updated with item availability information provided directly from shoppers 208. Following updating of the training datasets 320, the modeling engine 318 may retrain a model with the updated training datasets 320 and produce a new machine-learned item availability model 316.

Virtual Reality Components

In some embodiments, the online system 102 further includes a physical space engine 322. The physical space engine 322 receives information from one or more physical retail stores 104 describing the physical retail store(s) 104. In some embodiments, the physical space engine 322 is configured to communicate information received from a physical retail store 104 with the rendering database 328 upon receiving the information. Information received from a physical retail store 104 may describe attributes of physical elements within the physical retail store 104 and an arrangement of the physical elements within the physical retail store 104. An arrangement of physical elements within a physical retail store 104 may be described in relative terms, such that the positions of physical elements are described relative to each other (e.g., a physical element is described as being three feet north of another physical element) or in absolute terms (e.g., using GPS coordinates).

Examples of a physical element within a physical retail store 104 include an item sold at the physical retail store 104, an aisle, a shelf, a display area, a service counter, a dispenser, a sign, a customer of the physical retail store 104, an employee of the physical retail store 104, a shopping cart, a shopping basket, a building element, or any other suitable physical element within a physical retail store 104. For example, physical elements within a physical retail store 104 may include multiple aisles, shelves within the aisles, various display areas (e.g., frozen or refrigerated display cases, display tables, sample and promotional displays, etc.), and multiple dispensers (e.g., bag and coupon dispensers). In the above example, additional physical elements within the physical retail store 104 also may include signs (e.g., for different departments and describing categories of items included in each aisle), service counters (e.g., for a meat, a florist, or a pharmacy department and/or checkout counters), and various building elements (e.g. doors, windows, walls, flooring, stairs, light fixtures, etc.).

Physical elements within a physical retail store 104 may have various attributes. In embodiments in which a physical element within a physical retail store 104 is an inanimate object, attributes of the physical element may include a brand associated with the physical element, a size of the physical element, a packaging of the physical element, an image associated with the physical element, text associated with the physical element, a price of the physical element, a color of the physical element, a quantity associated with the physical element, a version of the physical element, a dimension of the physical element, a texture of the physical element, or any other suitable attributes of the physical element. For example, if physical elements within a physical retail store 104 include a can of soup, attributes of the can of soup may include a number of the cans of soup available, its packaging (i.e., a can), an associated image (e.g., a logo or picture included on the soup label), text on the soup label (e.g., the list of ingredients, preparation instructions, text indicating the brand and flavor of the soup, etc.), and information indicating a version of the soup (e.g., low sodium). In the above example, additional attributes of the can of soup may include a price of the can of soup, such as a dollar amount and/or a special deal (e.g., buy two, get one free), a quantity of soup included in the can (e.g., number of ounces), dimensions of the can, and a texture of the can (e.g., metallic). In embodiments in which physical elements within a physical retail store 104 include people, attributes of the people may include the number of people and information describing each person, such as each person's features (e.g., height, hair color, etc.) and clothing/accessories they are wearing. Attributes of a person also may include information describing any objects or entities with which they may be interacting (e.g., a service animal, children, a baby stroller, a shopping basket, etc.) and any actions they may be performing (e.g., picking produce, purchasing items, etc.).

As described above, information received from a physical retail store 104 may be collected by various components (e.g., cameras 148 and/or sensors 150 of one or more computing systems 146) within the physical retail store 104. As also described above, information collected by such components may be associated with various types of data (e.g., a name of the physical retail store 104, a geographic location associated with the physical retail store 104, a time at which the information was collected at the physical retail store 104, etc.). In some embodiments, the physical space engine 322 performs various calculations on the information received from a physical retail store 104 to determine attributes of physical elements within the physical retail store 104 and/or an arrangement of the physical elements within the physical retail store 104. For example, suppose that components of a computing system 146 within a physical retail store 104 include a speed sensor 150 and one or more cameras 148 mounted on a shopping cart. In this example, once the physical space engine 322 receives information collected by these components, it may use this information to determine the dimensions of physical elements within the physical retail store 104 and distances between them based on the times at which the shopping cart passed the physical elements captured by the camera(s) 148 and the speed at which the shopping cart was moving during those times. In the above example, if the camera(s) 148 have face detection capability, the physical space engine 322 may identify a physical element corresponding to a person by comparing a face detected on the physical element to profile images of users maintained in the user/customer database 314. In this example, if the physical space engine 322 identifies the person as a user/customer 204, the physical space engine 322 also may determine various actions performed by the person (e.g., purchasing items, placing items in a shopping cart, etc.). In some embodiments, the calculations described above may be performed on information describing a physical retail store 104 before the information is received by the physical space engine 322 (e.g., by a processor included in the computing system 146 based on instructions encoded on a memory included in the computing system 146).

The physical space engine 322 may be configured to store information received from a physical retail store 104 in a physical space database 324. In embodiments in which the physical space engine 322 performs various calculations on information received from a physical retail store 104 to determine attributes of physical elements within a physical retail store 104 and/or an arrangement of the physical elements within the physical retail store 104, the physical space engine 322 also may be configured to store the results of the calculations in the physical space database 324. Furthermore, in embodiments in which the physical space engine 322 receives information or performs calculations associated with a physical element corresponding to a person identified as a user/customer 204, the physical space engine 322 also may store the information in a user profile of the user/customer 204 (e.g., in the transaction records database 308, the user/customer database 314, the training datasets 320, and/or the action database 332).

In various embodiments, the online system 102 further includes a rendering engine 326. The rendering engine 326 may generate a rendering of a physical retail store 104 in a virtual reality environment, in which the rendering is configured to mimic one or more visual aspects of the physical retail store 104. The rendering of a physical retail store 104 includes multiple virtual reality elements representing a set of physical elements in the physical retail store 104 and the virtual reality elements are arranged based in part on the arrangement of the physical elements within the physical retail store 104. For example, the rendering engine 326 may generate a rendering of a physical retail store 104 that includes virtual reality elements representing physical elements within the physical retail store 104, in which the virtual reality elements appear visually similar to the physical elements (e.g., in size, shape, color, orientation, etc.). In this example, the virtual reality elements in the rendering also are arranged the same way as the physical elements (e.g., in the same positions relative to each other, at GPS coordinates in the virtual reality environment that match those of the physical elements in the real-life environment, etc.). In some embodiments, in addition to mimicking the visual aspects of a physical retail store 104, a rendering may mimic other sensory aspects as well. For example, a rendering of a physical retail store 104 may include an auditory aspect, such as the sound of items being scanned at a checkout counter, music being played in the physical retail store 104, etc., which may be experienced through headphones or speakers incorporated into a virtual reality headset. In this example, the rendering also may include a tactile aspect (e.g., a vibration of a shopping cart as it is being pushed), which may be experienced through controllers, gloves, etc. included in a virtual reality system.

In some embodiments, the rendering engine 326 also or alternatively may generate a rendering of a physical retail store 104 in another environment (e.g., an augmented reality environment and/or a mixed reality environment). In such embodiments, the rendering may include multiple corresponding elements (e.g., augmented reality elements and/or mixed reality elements) representing a set of physical elements in the physical retail store 104 that are arranged based in part on the arrangement of the physical elements within the physical retail store 104. Furthermore, in such embodiments, the rendering engine 326 may generate or update the rendering in a manner analogous to that described for generating or updating a rendering of a physical retail store 104 in a virtual reality environment.

The rendering engine 326 may generate a rendering of a physical retail store 104 in a virtual reality environment based in part on the information describing the physical retail store 104 and a user profile of a user/customer 204. The rendering engine 326 may access the physical space database 324 to retrieve information describing a physical retail store 104. The rendering engine 326 also may access the transaction records database 308, the user/customer database 314, the training datasets 320, and/or the action database 332 to retrieve information included in a user profile of a user/customer 204. The rendering engine 326 may do so based on information that uniquely identifies the user/customer 204 associated with information included in the user profile (e.g., login credentials, a username, an email address, or a phone number or some combination of information that uniquely identifies the user/customer 204, such as a first and last name and a home address). As described above, a user profile of a user/customer 204 may include information describing the user/customer 204 (e.g. name, geographic location, gender, shopping preferences, favorite items, stored payment instruments, profile picture, etc.) and information describing historical actions performed by the user/customer 204 associated with various physical elements within a physical retail store 104.

In some embodiments, the rendering engine 326 generates a rendering of a physical retail store 104 in a virtual reality environment based on a geographic location associated with the physical retail store 104 and a geographic location associated with a user/customer 204. For example, if a physical retail store 104 belongs to a chain of physical retail stores 104, based on a geographic location associated with a user/customer 204 included in their user profile, the rendering engine 326 may access the physical space database 324 and retrieve information describing the physical retail store 104 if it is within a threshold distance of the geographic location associated with the user/customer 204. In this example, the rendering engine 326 then generates a rendering of the physical retail store 104 in a virtual reality environment based on the retrieved information, such that the rendering includes multiple virtual reality elements representing a set of physical elements within the physical retail store 104 that are arranged based in part on the arrangement of the physical elements within the physical retail store 104. Alternatively, in the above example, the rendering engine 326 may access the physical space database 324 and retrieve information describing the physical retail store 104 if, among the chain of physical retail stores 104, it is geographically closest to the geographic location associated with the user/customer 204 and generate the rendering of the physical retail store 104 in a virtual reality environment based on the retrieved information.

In some embodiments, the rendering engine 326 may generate different renderings of a physical retail store 104 for different users/customers 204. The rendering engine 326 may generate renderings of a physical retail store 104 that differ only with respect to a particular variable (e.g., by adding or removing a virtual reality element or by arranging virtual reality elements differently) to perform an A/B test. For example, the rendering engine 326 may generate a first version of a rendering of a physical retail store 104, in which a first virtual reality element is located to the right of a second virtual reality element. In the above example, in a second version of the rendering, the first virtual reality element is located to the left of the second virtual reality element. Alternatively, in the above example, in the second version of the rendering, either the first virtual reality element may be removed from the rendering or a third virtual reality element may be added to the rendering.

The rendering engine 326 may use a user profile of a user/customer 204 to generate a rendering of a physical retail store 104 in a virtual reality environment that is customized for the user/customer 204. In various embodiments, the rendering engine 326 may generate a rendering of a physical retail store 104 based on a set of historical actions performed by a user/customer 204 associated with various physical elements within the physical retail store 104. In such embodiments, the rendering engine 326 may identify the physical elements with which the user/customer 204 interacted and generate the rendering based on the identified physical elements. For example, suppose that historical actions performed by a user/customer 204 indicate that the user/customer 204 has purchased only two different brands of canned soup. In this example, if shelves within a physical retail store 104 include six brands of canned soup, the rendering engine 326 may generate a rendering of the physical retail store 104 in a virtual reality environment for the user/customer 204, in which virtual reality elements representing the shelves only include virtual reality elements representing the two brands of canned soup that the user/ customer 204 has purchased. As an additional example, suppose that a sign within a physical retail store 104 that describes categories of items included in an aisle indicates that the aisle contains baking supplies, spices, and condiments and that historical actions performed by a user/customer 204 indicate that the only baking supply that the user/customer 204 has ever purchased is cake mix. In this example, the rendering engine 326 may generate a rendering of the physical retail store 104 in a virtual reality environment for the user/customer 204 that more easily directs the user/customer 204 to virtual reality elements representing cake mixes by including a virtual reality element in the rendering representing the sign that indicates that the aisle contains cake mixes, spices, and condiments.

A rendering of a physical retail store 104 in a virtual reality environment generated by the rendering engine 326 also may be customized for a user/customer 204 in other ways. In some embodiments, the rendering engine 326 also may identify content associated with a third-party system 130 for which a user/customer 204 is likely to have an affinity and generate a rendering of a physical retail store 104 in a virtual reality environment to include the content. For example, if virtual reality elements of a rendering of a physical retail store 104 may include one or more advertisements, the rendering engine 326 may select advertisements received from a third-party system 130 for which a user/customer 204 is likely to have an affinity based on a list of favorite items included in their user profile and/or historical actions performed by the user/customer 204 and include the advertisements in the rendering of the physical retail store 104.

The rendering engine 326 may communicate information describing renderings it generates in association with various types of information. In embodiments in which the rendering engine 326 generates a rendering of a physical retail store 104 in a virtual reality environment, in which the rendering includes content associated with a third-party system 130, the rendering engine 326 may communicate information describing the rendering and the user/customer 204 to the third-party system 130 and/or the action engine 330. Furthermore, in embodiments in which the rendering engine 326 generates different renderings of a physical retail store 104 in a virtual reality environment for different users/customers 204 (e.g., for A/B testing or customization), the rendering engine 326 may communicate information describing the renderings and the users/customers 204 to an additional online system 102, the physical retail store 104, and/or the action engine 330.

The rendering engine 326 also may update a rendering of a physical retail store 104 in a virtual reality environment based in part on an update to information describing the physical retail store 104. For example, suppose that the rendering engine 326 accesses the physical space database 324 and retrieves information indicating that attributes of physical elements within a physical retail store 104 and/or an arrangement of the physical elements within the physical retail store 104 have changed (e.g., items in a seasonal aisle have changed or a banner celebrating a local event has been added). In this example, the rendering engine 326 may update a rendering of the physical retail store 104 based on the change(s). The rendering engine 326 also may update a rendering of a physical retail store 104 in a virtual reality environment based in part on any of the information used to generate the rendering (e.g., a user profile of a user/customer 204) and may update renderings differently for different users/customers 204, (e.g., for A/B testing or customization).

The rendering engine 326 may update a rendering of a physical retail store 104 at various time intervals. In some embodiments, the rendering engine 326 may update a rendering of a physical retail store 104 periodically (e.g., once every five minutes). In alternative embodiments, the rendering engine 326 may update a rendering of a physical retail store 104 continuously (e.g., based on a video feed and various readings continuously received from the physical retail store 104). In some embodiments, the rendering engine 326 may update a rendering of a physical retail store 104 upon receiving information from the physical space engine 322 indicating it has received an update to information describing the physical retail store 104 (e.g., from a motion-activated camera 148 at the physical retail store 104). In additional embodiments, the rendering engine 326 may update different portions of a rendering of a physical retail store 104 at different time intervals. For example, the rendering engine 326 may update virtual reality elements representing more static physical elements of a physical retail store 104 (e.g., shelves, service counters, stairs, walls, signs, etc.) less frequently than virtual reality elements representing more dynamic physical elements of the physical retail store 104 (e.g., customers of the physical retail store 104, shopping carts, items sold at the physical retail store 104, etc.).

In some embodiments, the rendering engine 326 is configured to store all or a portion of a rendering of a physical retail store 104 in a rendering database 328. For example, if the rendering engine 326 does not continuously update a rendering of a physical retail store 104, the rendering engine 326 may store a rendering of the physical retail store 104 in the rendering database 328 so that it may be retrieved from the rendering database 328 for presentation to a user/customer 204 until the rendering engine 326 updates the rendering. As an additional example, if the rendering engine 326 updates different portions of a rendering of a physical retail store 104 at different time intervals, the rendering engine 326 may store the different portions of the rendering in the rendering database 328 so that they may be retrieved for presentation to a user/customer 204 until they are updated. The rendering of a physical retail store 104 and/or portions of the rendering may be stored in the rendering database 328 in association with information indicating a time at which each rendering or portion of the rendering was generated or updated by the rendering engine 326 and information describing the rendering/portion of the rendering (e.g., information identifying the physical retail store 104, physical elements, etc.).

In various embodiments, the online system 102 further includes an action engine 330. The action engine 330 receives information describing actions performed by a user/customer 204 (e.g., from a client device 110 associated with the user/customer 204) and may be configured to store the information in the action database 332. As described above, information stored in the action database 332 may be included among a set of historical actions performed by a user/customer 204 associated with physical elements within a physical retail store 104. In some embodiments, actions performed by a user/customer 204 associated with physical elements within a physical retail store 104 include actions performed by the user/customer 204 in a virtual reality environment. For example, if a user/customer 204 samples virtual reality elements in a rendering of a physical retail store 104 in a virtual reality environment, in which the virtual reality elements represent physical elements within the physical retail store 104, information describing this action may be stored in the action database 332. In the above example, if the user/customer 204 subsequently places virtual reality elements representing physical elements (e.g., items sold at the physical retail store 104) into a virtual reality element representing a shopping cart, information describing this action also may be stored in the action database 332.

In some embodiments, the action engine 330 may communicate information describing a set of actions performed by users/customers 204 to an additional online system (e.g., an online concierge system) 102, a physical retail store 104, and/or a third-party system 130. For example, suppose that the rendering engine 326 generates a rendering of a physical retail store 104 in a virtual reality environment that is customized for a user/customer 204, in which the rendering includes an advertisement associated with a third-party system 130 and that the rendering engine 326 communicates information describing the rendering and the user/customer 204 to the third-party system 130 and the action engine 330. In this example, the action engine 330 subsequently may communicate information to the third-party system 130 describing actions (or absence of actions) performed by the user/customer 204 in the virtual reality environment associated with the advertisement, such as actions associated with virtual reality elements representing items in the advertisement. As an additional example, suppose that the rendering engine 326 generates different renderings of a physical retail store 104 in a virtual reality environment for different users/customers 204 for A/B testing or to customize the rendering for the users/customers 204. In this example, suppose also that the rendering engine 326 has communicated information describing the renderings and the users/customers 204 to an additional online system (e.g., an online concierge system) 102, the physical retail store 104, and the action engine 330. In this example, the action engine 330 subsequently may communicate information to the additional online system 102 and the physical retail store 104 describing actions (or absence of actions) performed by the users/customers 204 in the virtual reality environment associated with physical elements represented by virtual reality elements that were customized for the users/customers 204.

Figure 3B:
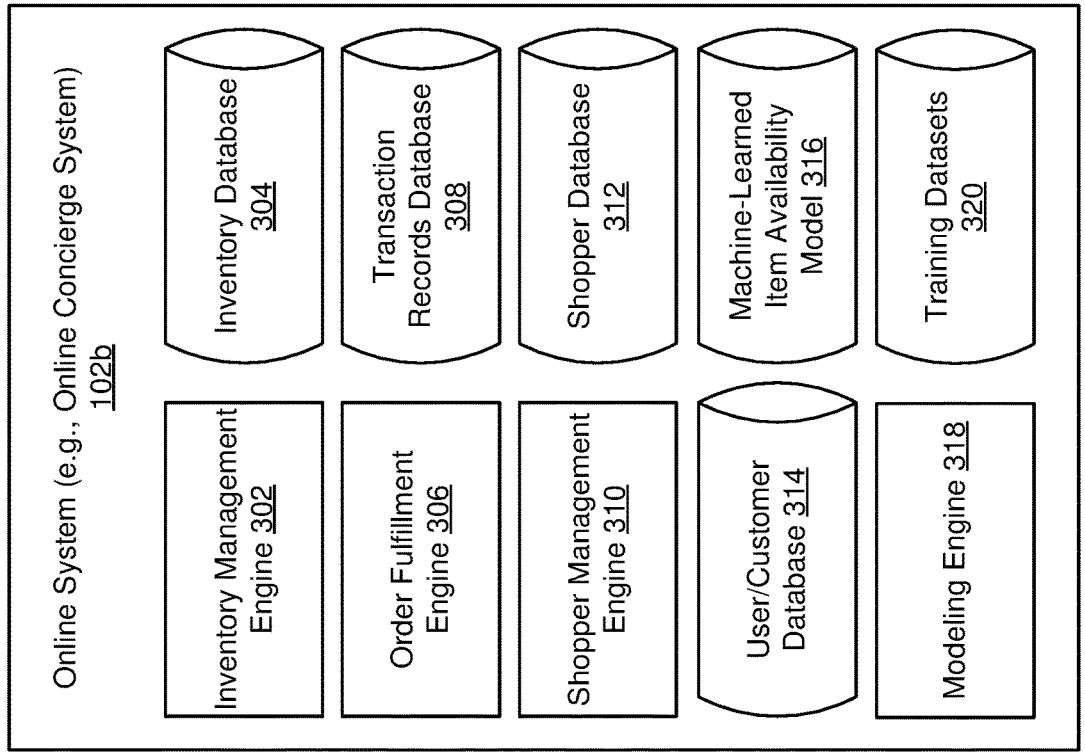
FIG. 3B is a diagram of multiple online systems, in accordance with one or more illustrative aspects of the disclosure.
Figure 3B:
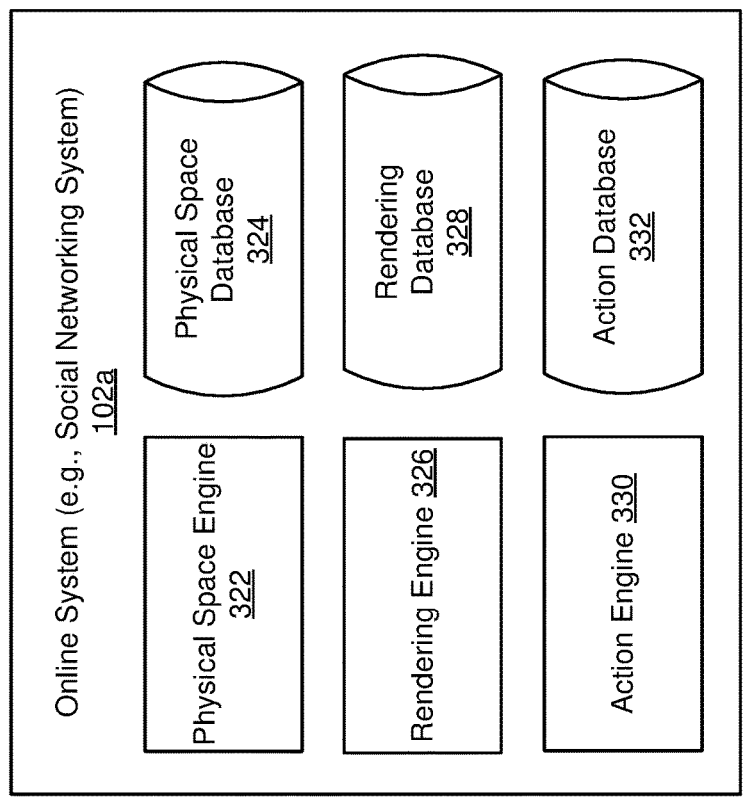

FIG. 3B is a diagram of multiple online systems 102, in accordance with one or more illustrative aspects of the disclosure. In various embodiments, the online systems 102 may include different or additional modules than those described in conjunction with FIG. 3B. Furthermore, in some embodiments, the online systems 102 include fewer modules than those described in conjunction with FIG. 3B.

In some embodiments, a first online system (e.g., a social networking system) 102a is configured to receive requests from one or more users 204 of the first online system 102a to generate a rendering of a physical retail store 104 in an environment (e.g., a virtual reality environment), while a second online system (e.g., an online concierge system) 102b is configured to receive orders from one or more customers 204 of the second online system 102b to be fulfilled at one or more physical retail stores 104. In such embodiments, one or more customers 204 of the second online system 102b are also users 204 of the first online system 102a. Furthermore, in some embodiments, components of the first online system 102a may include the physical space engine 322, the physical space database 324, the rendering engine 326, the rendering database 328, the action engine 330, and the action database 332, while components of the second online system 102b may include the inventory management engine 302, the inventory database 304, the order fulfillment engine 306, the transaction records database 308, the shopper management engine 310, the shopper database 312, the user/customer database 314, the machine-learned item availability model 316, the modeling engine 318, and the training datasets 320. The components of the online systems 102 illustrated in FIG. 3B function in the same manner described above in conjunction with FIG. 3A and one or more components of the first online system 102a are configured to access one or more components of the second online system 102b. For example, the rendering engine 326 of the first online system 102a is configured to access information maintained in the second online system 102b included in a user profile of a user/customer 204 stored in the transaction records database 308, the user/customer database 314, and/or the training datasets 320.

Figure 4A:
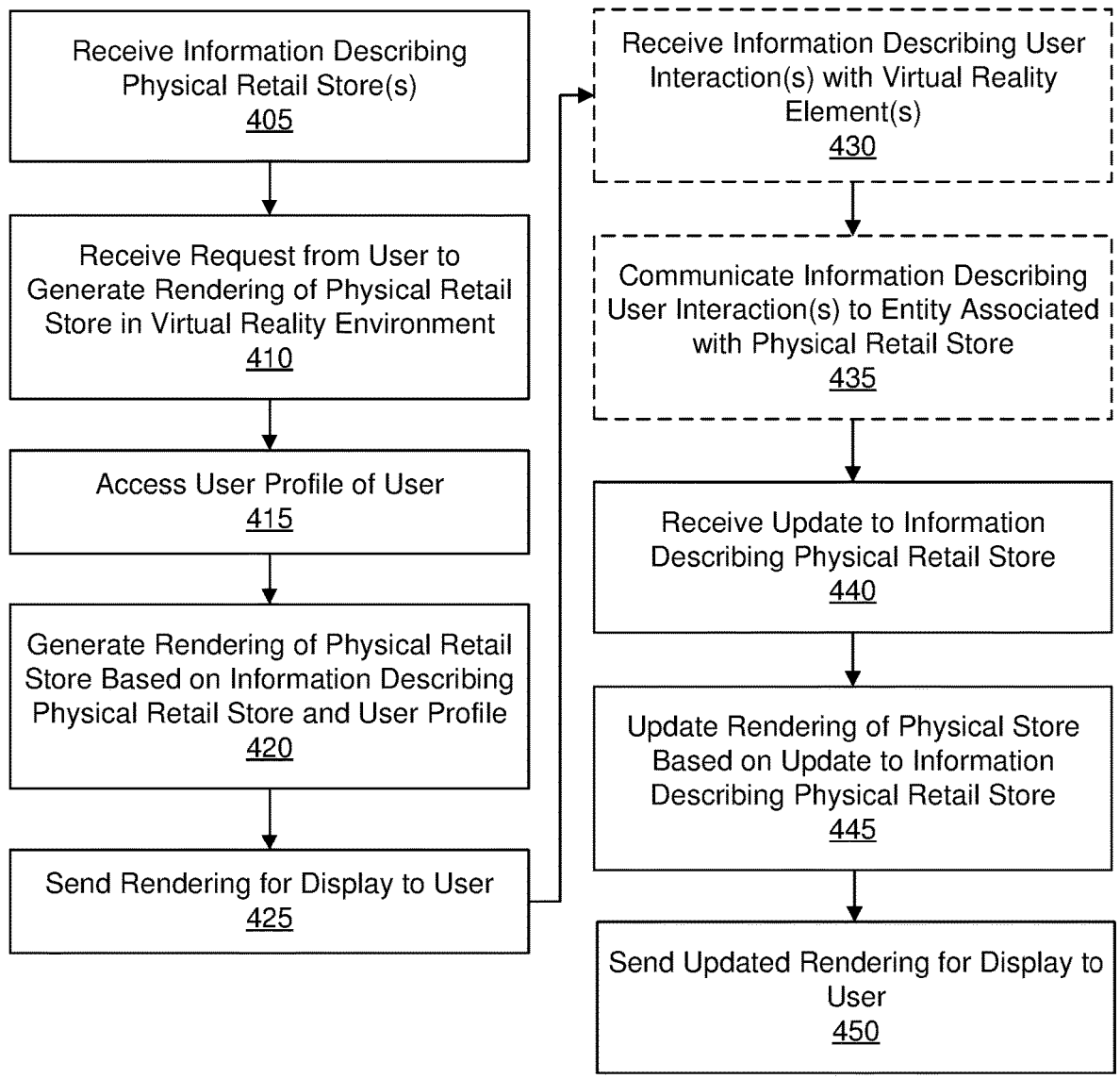
FIG. 4A is a flowchart of a method for synchronizing a rendering of a physical retail store in a virtual reality environment with the physical retail store, in accordance with one or more illustrative aspects of the disclosure.
Figure 4B:
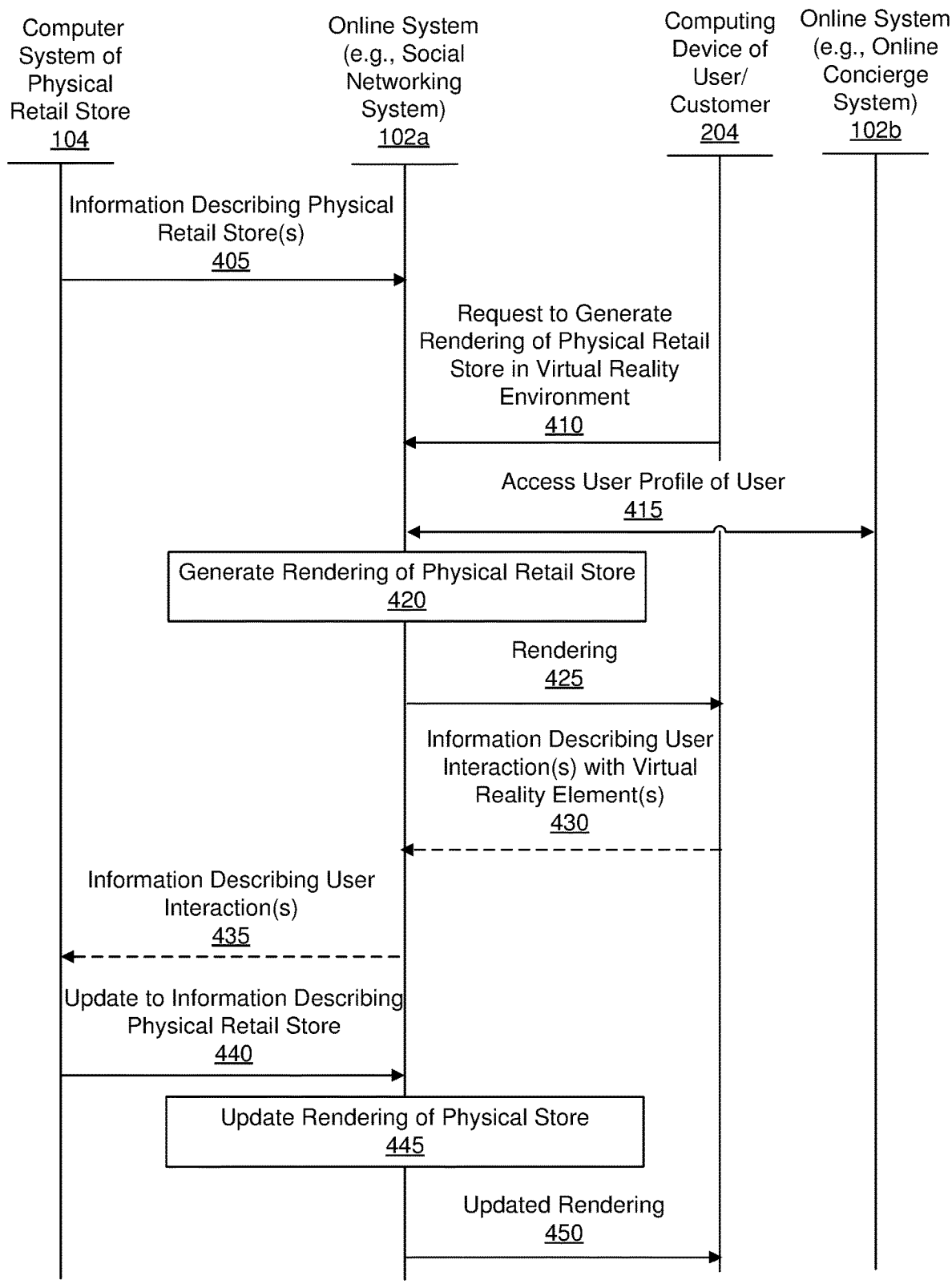
FIG. 4B is an interaction diagram of a method for synchronizing a rendering of a physical retail store in a virtual reality environment with the physical retail store, in accordance with one or more illustrative aspects of the disclosure.

Synchronizing a Rendering of a Physical Retail Store in a Virtual Reality Environment with the Physical Retail Store FIG. 4A is a flowchart of a method for synchronizing a rendering of a physical retail store 104 in a virtual reality environment with the physical retail store 104, while FIG. 4B is an interaction diagram of a method for synchronizing a rendering of a physical retail store 104 in a virtual reality environment with the physical retail store 104. In various embodiments, the methods include different or additional steps than those described in conjunction with FIGS. 4A and 4B. Further, in some embodiments, the steps of the method may be performed in different orders than the order described in conjunction with FIGS. 4A and 4B. The methods described in conjunction with FIGS. 4A and 4B may be carried out by the online system(s) 102 in various embodiments, while in other embodiments, the steps of the methods are performed by any online system(s) capable of retrieving items.

As shown in FIG. 4B, in some embodiments, a first online system (e.g., a social networking system) 102a is configured to receive requests from one or more users 204 of the first online system 102a to generate a rendering of a physical retail store 104 in a virtual reality environment. In such embodiments, a second online system (e.g., an online concierge system) 102b is configured to receive orders from one or more customers 204 of the second online system 102b (e.g., delivery orders to be fulfilled at one or more physical retail stores 104). Additionally, in such embodiments, one or more customers 204 of the second online system 102b are also users 204 of the first online system 102a. Furthermore, in such embodiments, the first online system 102a is configured to access information maintained in the second online system 102b. Unless otherwise noted, the steps of the method described in the interaction diagram of FIG. 4B are analogous to those described in conjunction with FIG. 4A.

Referring now to FIG. 4A, the online system 102 receives 405 (e.g., via the physical space engine 322) information describing one or more physical retail stores 104. The information received 405 from each physical retail store 104 may describe attributes of physical elements within the physical retail store 104 and an arrangement of the physical elements within the physical retail store 104. Examples of a physical element within a physical retail store 104 include an item sold at the physical retail store 104, an aisle, a shelf, a display area, a service counter, a dispenser, a sign, a customer of the physical retail store 104, an employee of the physical retail store 104, a shopping cart, a shopping basket, a building element, or any other suitable physical element within a physical retail store 104. In embodiments in which a physical element within a physical retail store 104 is an inanimate object, attributes of the physical element may include a brand associated with the physical element, a size of the physical element, a packaging of the physical element, an image associated with the physical element, text associated with the physical element, a price of the physical element, a color of the physical element, a quantity associated with the physical element, a version of the physical element, a dimension of the physical element, a texture of the physical element, or any other suitable attributes of the physical element. In embodiments in which physical elements within a physical retail store 104 include people, attributes of the people may include the number of people and information describing each person, such as each person's features (e.g., height, hair color, etc.) and clothing/accessories they are wearing. Attributes of a person also may include information describing any objects or entities with which they may be interacting (e.g., a service animal, children, a baby stroller, a shopping basket, etc.) and any actions they may be performing (e.g., picking produce, purchasing items, etc.). An arrangement of physical elements within a physical retail store 104 may be described in relative terms, such that the positions of the physical elements are described relative to each other (e.g., a physical element is described as being three feet north of another physical element) or in absolute terms (e.g., using GPS coordinates).

Information received 405 from a physical retail store 104 may be collected by various components (e.g., cameras 148 and/or sensors 150 of one or more computing systems 146) within the physical retail store 104. Information collected by such components may be associated with various types of data (e.g., a name of the physical retail store 104, a geographic location associated with the physical retail store 104, a time at which the information was collected at the physical retail store 104, etc.). In some embodiments, the online system 102 performs (e.g., using the physical space engine 322) various calculations on the information received 405 from a physical retail store 104 to determine attributes of physical elements within the physical retail store 104 and/or an arrangement of the physical elements within the physical retail store 104. For example, suppose that components of a computing system 146 within a physical retail store 104 include a speed sensor 150 and one or more cameras 148 mounted on a shopping cart. In this example, once the online system 102 receives 405 information collected by these components, it may use this information to determine the dimensions of physical elements within the physical retail store 104 and distances between them based on the times at which the shopping cart passed the physical elements captured by the camera(s) 148 and the speed at which the shopping cart was moving during those times. In the above example, if the camera(s) 148 have face detection capability, the online system 102 may identify a physical element corresponding to a person by comparing a face detected on the physical element to profile images of users/customers 204 (e.g., in the user/customer database 314). Alternatively, in the above example, suppose that the online system 102 at which the information is received 405 is a first online system 102a in an environment 200 that includes multiple online systems 102, as shown in FIG. 4B. In this example, the first online system 102a may access a second online system 102b and compare (e.g., using the physical space engine 322 of the first online system 102a) the face to profile images of users maintained in the second online system 102b (e.g., in the user/customer database 314 of the second online system 102b). In the above example, if the first online system 102a identifies the person as a user/customer 204, the first online system 102a also may determine various actions performed by the person (e.g., purchasing items, placing items in a shopping cart, etc.). In some embodiments, the calculations described above may be performed on information describing a physical retail store 104 before the information is received 405 by the online system 102 (e.g., by a processor included in the computing system 146 based on instructions encoded on a memory included in the computing system 146).

In some embodiments, the online system 102 is configured to store the information received 405 from the physical retail store(s) 104 (e.g., in the physical space database 324). In embodiments in which the online system 102 performs various calculations on information received 405 from a physical retail store 104 to determine attributes of physical elements within the physical retail store 104 and/or an arrangement of the physical elements within the physical retail store 104, the online system 102 is also configured to store the results of the calculations (e.g., in the physical space database 324). Furthermore, in embodiments in which the online system 102 receives 405 information or performs calculations associated with a physical element corresponding to a person identified as a user/customer 204, the online system 102 also may store the information and/or results of the calculations in a user profile of the user/customer 204 (e.g., in the action database 332). In such embodiments, the online system 102 also or alternatively may communicate the information and/or results of the calculations to an additional online system 102, which may then store the information and/or results. For example, after receiving 405 the information from the physical retail store(s) 104, the first online system 102a shown in FIG. 4B may perform calculations associated with a physical element corresponding to a person identified as a user/customer 204 and communicate the information and results of the calculations to the second online system 102b. In this example, the second online system 102b may then store the information and/or results in a user profile of the user/customer 204 (e.g., in the transaction records database 308, the user/customer database 314, and/or the training datasets 320 of the second online system 102b).

Referring back to FIG. 4A, the online system 102 then receives 410 a request from a user/customer 204 to generate a rendering of a physical retail store 104 in a virtual reality environment. The online system 102 may receive 410 the request via a client device 110 associated with the user/customer 204. For example, the online system 102 receives 410 the request from the user/customer 204 via a virtual reality headset configured to be worn by the user/customer 204, in which the virtual reality headset is executing an application that is used to access the virtual reality environment. The request may include information that uniquely identifies the user/customer 204 (e.g., login credentials, a username, an email address, or a phone number or some combination of information that uniquely identifies the user/customer 204, such as a first and last name and a home address). In alternative embodiments, the online system 102 may receive 410 a request from the user/customer 204 to generate a rendering of the physical retail store 104 in another environment (e.g., an augmented reality environment or a mixed reality environment), which also may include information that uniquely identifies the user/customer 204.

The online system 102 then accesses 415 (e.g., using the rendering engine 326) a user profile of the user/customer 204 maintained in the online system 102 (e.g., in the transaction records database 308, the user/customer database 314, the training datasets 320, and/or the action database 332). In some embodiments, the online system 102 also or alternatively may access 415 the user profile of the user/ customer 204 or portions of the user profile maintained in an additional online system 102. For example, as shown in FIG. 4B, the first online system 102a at which the request was received 410 may access 415 a user profile of the user/customer 204 maintained in the second online system 102b (e.g., in the transaction records database 308, the user/customer database 314, and/or the training datasets 320). The online system 102 may access 415 the user profile based on the information included in the request received 410 from the user/customer 204 that uniquely identifies the user/customer 204 that is also associated with information included in the user profile. As described above, a user profile of a user/customer 204 may include information describing the user/customer 204 (e.g. name, geographic location, gender, shopping preferences, favorite items, stored payment instruments, profile picture, etc.) and information describing historical actions performed by the user/customer 204 associated with various physical elements within a physical retail store 104.

Referring to FIG. 4A, the online system 102 generates 420 (e.g., using the rendering engine 326) a rendering of the physical retail store 104 in the virtual reality environment, in which the rendering is configured to mimic one or more visual aspects of the physical retail store 104. The rendering of the physical retail store 104 includes multiple virtual reality elements representing a set of physical elements within the physical retail store 104 and the virtual reality elements are arranged based in part on the arrangement of the physical elements within the physical retail store 104. For example, the online system 102 may generate 420 a rendering of the physical retail store 104 that includes virtual reality elements representing physical elements within the physical retail store 104, in which the virtual reality elements appear visually similar to the physical elements (e.g., in size, shape, color, orientation, etc.). In this example, the virtual reality elements in the rendering also are arranged the same way as the physical elements (e.g., in the same relative or absolute positions as the physical elements in the physical retail store 104). In some embodiments, in addition to mimicking the visual aspects of the physical retail store 104, the rendering may mimic other sensory aspects as well. For example, the rendering of the physical retail store 104 may include an auditory aspect, such as the sound of items being scanned at a checkout counter, music being played in the physical retail store 104, etc., which may be experienced through headphones or speakers incorporated into a virtual reality headset. In this example, the rendering also may include a tactile aspect (e.g., a vibration of a shopping cart as it is being pushed), which may be experienced through controllers, gloves, etc. included in a virtual reality system.

In embodiments in which the online system 102 receives 410 a request from the user/customer 204 to generate 420 the rendering of the physical retail store 104 in another environment (e.g., an augmented reality environment or a mixed reality environment), the online system 102 may generate 420 the rendering for the appropriate environment. In such embodiments, the rendering may include multiple elements (e.g., augmented reality elements and/or mixed reality elements) representing a set of physical elements within the physical retail store 104. Furthermore, in embodiments in which the online system 102 generates 420 the rendering of the physical retail store 104 in another environment, the online system 102 may generate 420 the rendering in a manner analogous to that described for generating the rendering of the physical retail store 104 in the virtual reality environment.

The online system 102 may generate 420 the rendering of the physical retail store 104 in the virtual reality environment based in part on the information describing the physical retail store 104 and a user profile of the user/customer 204. In some embodiments, the online system 102 generates 420 the rendering based on a geographic location associated with the physical retail store 104 and a geographic location associated with the user/customer 204. For example, if the physical retail store 104 belongs to a chain of physical retail stores 104, based on a geographic location associated with the user/customer 204 included in their user profile, the online system 102 may retrieve information describing the physical retail store 104 (e.g., from the physical space database 324) if it is within a threshold distance of the geographic location associated with the user/customer 204. In this example, the online system 102 then generates 420 the rendering of the physical retail store 104 in the virtual reality environment based on the retrieved information, such that the rendering includes multiple virtual reality elements representing a set of physical elements within the physical retail store 104 that are arranged based in part on the arrangement of the physical elements within the physical retail store 104. Alternatively, in the above example, the online system 102 may retrieve information describing the physical retail store 104 if, among the chain of physical retail stores 104, it is geographically closest to the geographic location associated with the user/customer 204 and generate 420 the rendering of the physical retail store 104 in the virtual reality environment based on the retrieved information.

Figure 5B:
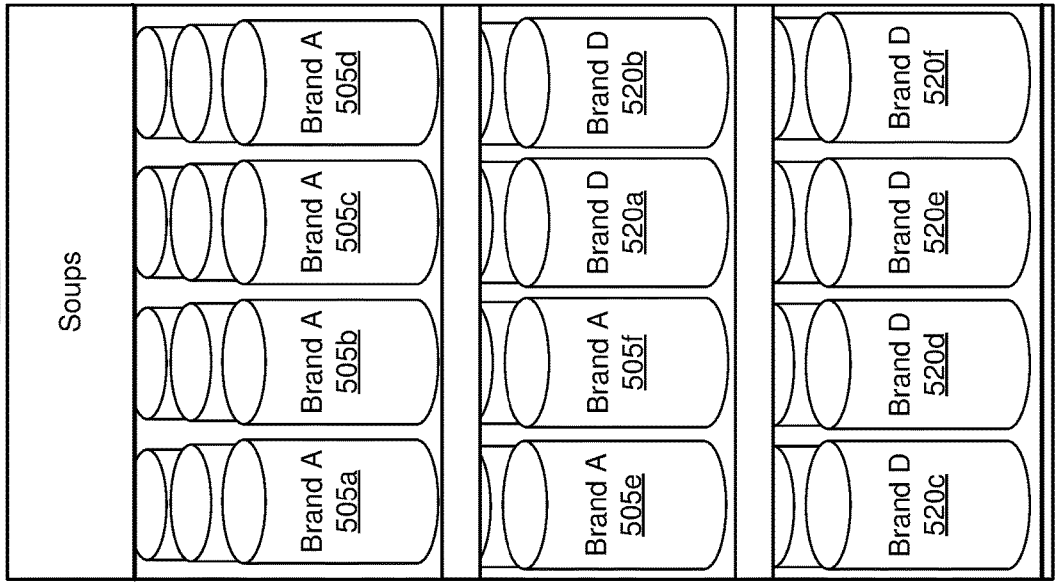
FIG. 5B illustrates virtual reality elements and their arrangement within a rendering of a physical retail store in a virtual reality environment, in accordance with one or more illustrative aspects of the disclosure.
Figure 5A:
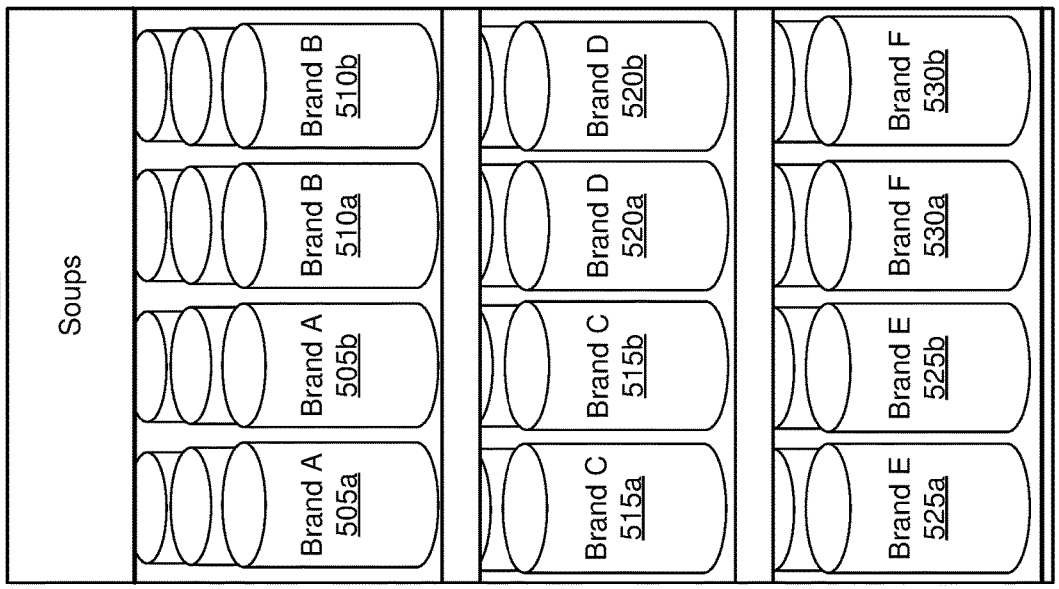
FIG. 5A illustrates physical elements and their arrangement within a physical retail store, in accordance with one or more illustrative aspects of the disclosure.

The online system 102 may use a user profile of the user/customer 204 to generate 420 the rendering of the physical retail store 104 in the virtual reality environment, such that the rendering is customized for the user/customer 204. In various embodiments, the online system 102 may generate 420 the rendering of the physical retail store 104 based on a set of historical actions performed by the user/customer 204 associated with various physical elements within the physical retail store 104. In such embodiments, the online system 102 may identify the physical elements with which the user/customer 204 interacted and generate 420 the rendering based on the identified physical elements. For example, suppose that historical actions performed by the user/customer 204 indicate that the user/customer 204 has purchased only two different brands of canned soup. As shown in FIG. 5A, which illustrates physical elements and their arrangement within a physical retail store 104, in accordance with one or more illustrative aspects of the disclosure, suppose also that shelves of soup within a physical retail store 104 include six brands of canned soup (Brand A 505, Brand B 510, Brand C 515, Brand D 520, Brand E 525, and Brand F 530). In this example, the online system 102 may generate 420 a rendering 500a of the physical retail store 104 in a virtual reality environment for the user/customer 204 as shown in FIG. 5B, which illustrates virtual reality elements and their arrangement within a rendering of a physical retail store 104 in a virtual reality environment, in accordance with one or more illustrative aspects of the disclosure. As shown in this rendering 500a, virtual reality elements representing the shelves only include virtual reality elements representing the two brands of canned soup (Brand A 505 and Brand D 520) that the user/customer 204 has purchased. As an additional example, suppose that a sign in the physical retail store 104 that describes categories of items included in an aisle indicates that the aisle contains baking supplies, spices, and condiments and that historical actions performed by the user/ customer 204 indicate that the only baking supply that the user/customer 204 has ever purchased is cake mix. In this example, the online system 102 may generate 420 the rendering of the physical retail store 104 in the virtual reality environment for the user/customer 204 that more easily directs the user/customer 204 to virtual reality elements representing cake mixes by including a virtual reality element in the rendering representing the sign that indicates that the aisle contains cake mixes, spices, and condiments.

The rendering generated 420 by the online system 102 also may be customized for the user/customer 204 in other ways. In some embodiments, the online system 102 may identify content associated with a third-party system 130 for which the user/customer 204 is likely to have an affinity and generate 420 the rendering to include the content. For example, if virtual reality elements of the rendering of the physical retail store 104 may include one or more advertisements, the online system 102 may select advertisements received from a third-party system 130 for which the user/customer 204 is likely to have an affinity based on a list of favorite items included in their user profile and/or historical actions performed by the user/customer 204 and include the advertisements in the rendering of the physical retail store 104.

The online system 102 may communicate (e.g., using the rendering engine 326) information describing the rendering in association with various types of information. In embodiments in which the rendering generated 420 by the online system 102 includes content associated with a third-party system 130, the online system 102 may communicate information describing the rendering and the user/customer 204 to the third-party system 130. Furthermore, in embodiments in which the online system 102 generates (in step 420) different renderings of the physical retail store 104 in a virtual reality environment for different users/customers 204 (e.g., for A/B testing, as further described below, or customization), the online system 102 may communicate information describing the rendering and the user/customer 204 to an additional online system 102. For example, after generating 420 the rendering of the physical retail store 104, the first online system 102a shown in FIG. 4B may communicate information describing the rendering and the user/customer 204 to the second online system 102b and/or the physical retail store 104. In some embodiments, the online system 102 is configured to store all or a portion of the rendering of the physical retail store 104 (e.g., in the rendering database 328).

Referring to FIG. 4A, the online system 102 then sends 425 the rendering of the physical retail store 104 in the virtual reality environment for display to the user/customer 204. The online system 102 may send 425 the rendering to the user/customer 204 via a client device 110 (e.g., a virtual reality headset) associated with the user/customer 204. In embodiments in which the online system 102 generates 420 the rendering of the physical retail store 104 in another environment (e.g., an augmented reality environment or a mixed reality environment), the online system 102 sends 425 the rendering in the appropriate environment for display to the user/customer 204.

In some embodiments, the online system 102 may receive 430 (e.g., via the action engine 330) information describing one or more interactions by the user/customer 204 with one or more of the virtual reality elements within the rendering (e.g., via a client device 110 associated with the user/customer 204). In such embodiments, the online system 102 may be configured to store the information (e.g., in the action database 332). For example, if the user/customer 204 samples virtual reality elements in the rendering of the physical retail store 104 in the virtual reality environment, in which the virtual reality elements represent physical elements within the physical retail store 104, information describing this action may be stored in the online system 102 (e.g., in the action database 332). In the above example, if the user/customer 204 subsequently places virtual reality elements representing physical elements (e.g., items sold at the physical retail store 104) into a virtual reality element representing a shopping cart, information describing this action also may be stored in the online system 102. In embodiments in which the online system 102 generates 420 the rendering of the physical retail store 104 in another environment (e.g., an augmented reality environment or a mixed reality environment), the online system 102 may receive 430 information describing one or more interactions by the user/customer 204 with one or more of the corresponding types of elements within the rendering. In some embodiments, the information received 430 by the online system 102 describes virtual reality elements representing items that the user/customer 204 placed into a virtual reality element representing a shopping cart, a shopping basket, a shopping list, etc. while accessing the virtual reality environment as well as a request from the user/customer 204 to place an order for items corresponding to the virtual reality elements. In such embodiments, the online system 102 may proceed to fulfill the order (e.g., using the order fulfillment engine 306).

The online system 102 may communicate 435 (e.g., using the action engine 330) the information describing the interaction(s) by the user/customer 204 to an entity associated with the physical retail store 104 and/or a third-party system 130. For example, suppose that the online system 102 generates (in step 420) different renderings of the physical retail store 104 in the virtual reality environment for different users/customers 204 for A/B testing or to customize the rendering for the users/customers 204. In this example, suppose also that the online system 102 has communicated information describing the renderings and the users/customers 204 to the physical retail store 104. In this example, the online system 102 subsequently may communicate 435 information to the physical retail store 104 describing actions (or absence of actions) performed by the user/customer 204 in the virtual reality environment associated with physical elements represented by virtual reality elements that were customized for the user/customer 204, as shown in FIG. 4B. As an additional example, suppose that the online system 102 generates 420 the rendering of the physical retail store 104 in the virtual reality environment to include an advertisement associated with a third-party system 130 and that the online system 102 communicates information describing the rendering and the user/customer 204 to the third-party system 130. In this example, the online system 102 subsequently may communicate 435 information to the third-party system 130 describing actions (or absence of actions) performed by the user/customer 204 in the virtual reality environment associated with the advertisement, such as actions associated with virtual reality elements representing items in the advertisement.

The online system 102 also or alternatively may communicate 435 the information describing the interaction(s) by the user/customer 204 to an additional online system 102. For example, suppose that the information received 430 by the first online system 102a shown in FIG. 4B describes virtual reality elements representing items that the user/customer 204 placed into a virtual reality element representing a shopping cart, a shopping basket, a shopping list, etc.

while accessing the virtual reality environment, as well as a request from the user/customer 204 to place an order for items corresponding to the virtual reality elements. In this example, the first online system 102a may communicate 435 the request to the second online system 102b, which may proceed to fulfill the order (e.g., using the order fulfillment engine 306 of the second online system 102b). In the above example, the request may include information describing the order (e.g., information identifying the items and quantity of items included in the order) and information identifying the physical retail store 104. In embodiments in which the online system 102 receives 430 information describing one or more interactions by the user/customer 204 with one or more elements in other types of environments (e.g., augmented reality or mixed reality environments), the online system 102 similarly may communicate 435 information describing the interaction(s) to an additional online system 102, the physical retail store 104, and/or a third-party system 130.

The online system 102 may communicate 435 information describing the interaction(s) to an additional online system 102, the physical retail store 104, and/or a third-party system 130 for various reasons. For example, the information may be useful to an additional online system (e.g., an online concierge system) 102, by providing insights about the effectiveness of advertisements, the relevance of product search terms, etc. As an additional example, the information may be useful to the physical retail store 104 by providing insights about how different layouts of the store may be more appealing than others. In this example, the physical retail store 104 subsequently may change its layout based on this information. As yet another example, the information may be useful to a third-party system 130 associated with advertisements presented to the user/customer 204 or brands of consumer packaged goods by providing insights about the effectiveness of advertisements and promotional displays for various products.

Referring to FIG. 4A, the online system 102 receives 440 (e.g., via the physical space engine 322) an update to the information describing the physical retail store 104. The information may describe updates to the attributes of the physical elements within the physical retail store 104 and/or updates to the arrangement of the physical elements within the physical retail store 104. For example, the online system 102 may receive 440 an update to the information describing the physical retail store 104 if video feeds from cameras 148 and various readings from sensors 150 included in computing systems 146 at the physical retail store 104 are continuously transmitted from the physical retail store 104 to the online system 102. Similar to the description above, in some embodiments, the online system 102 performs various calculations on the update to the information received 440 from the physical retail store 104 to determine attributes of the physical elements within the physical retail store 104 and/or the arrangement of the physical elements within the physical retail store 104. The online system 102 also may be configured to store the results of the calculations (e.g., in the physical space database 324).

The online system 102 then updates 445 (e.g., using the rendering engine 326) the rendering of the physical retail store 104 in the virtual reality environment based in part on the update to the information describing the physical retail store 104. For example, suppose that the online system 102 accesses information (e.g., in the physical space database 324) indicating that attributes of the physical elements within the physical retail store 104 and/or an arrangement of the physical elements within the physical retail store 104 have changed (e.g., items in a seasonal aisle have changed or a banner celebrating a local event has been added). In this example, the online system 102 may update 445 the rendering of the physical retail store 104 based on the change(s). The online system 102 also may update 445 the rendering of the physical retail store 104 in the virtual reality environment based in part on any of the information used to generate 420 the rendering (e.g., the user profile of the user/customer 204) and may update 445 the rendering differently for different users/customers 204 (e.g., for A/B testing or customization). In embodiments in which the online system 102 generates 420 the rendering of the physical retail store 104 in another environment (e.g., an augmented reality environment or a mixed reality environment), the online system 102 may update 445 the rendering for the appropriate environment in an analogous manner.

The online system 102 may update 445 the rendering of the physical retail store 104 at various time intervals. In some embodiments, the online system 102 may update 445 the rendering of the physical retail store 104 periodically (e.g., once every five minutes). In alternative embodiments, the online system 102 may update 445 the rendering of the physical retail store 104 continuously (e.g., based on a video feed and various readings continuously received 440 from the physical retail store 104). In some embodiments, the online system 102 may update 445 the rendering of the physical retail store 104 upon receiving 440 the update to the information describing the physical retail store 104 (e.g., from a motion-activated camera 148 at the physical retail store 104). In additional embodiments, the online system 102 may update (in step 445) different portions of the rendering of the physical retail store 104 at different time intervals. For example, the online system 102 may update (in step 445) virtual reality elements representing more static physical elements of the physical retail store 104 (e.g., shelves, service counters, stairs, walls, signs, etc.) less frequently than virtual reality elements representing more dynamic physical elements of the physical retail store 104 (e.g., customers of the physical retail store 104, shopping carts, items sold at the physical retail store 104, etc.).

In some embodiments, the online system 102 is configured to store all or a portion of the rendering of the physical retail store 104 (e.g., in the rendering database 328). For example, if the online system 102 does not continuously update 445 the rendering of the physical retail store 104, the online system 102 may store the rendering of the physical retail store 104 so that it may be retrieved for presentation to a user/customer 204 until the online system 102 updates 445 the rendering. As an additional example, if the online system 102 updates (in step 445) different portions of the rendering of the physical retail store 104 at different time intervals, the online system 102 may store the different portions of the rendering so that they may be retrieved for presentation to a user/customer 204 until they are updated 445. The rendering of the physical retail store 104 and/or portions of the rendering may be stored in association with information indicating a time at which each rendering or portion of the rendering was generated 420 or updated 445 by the online system 102 and information describing the rendering/portion of the rendering (e.g., information identifying the physical retail store 104, physical elements, etc.).

The online system 102 then sends 450 the updated rendering of the physical retail store 104 for display to the user/customer 204. The updated rendering may be sent 450 for display to the user/customer 204 via a client device 110 (e.g., a virtual reality headset) associated with the user/customer 204.

Although not shown in FIG. 4A or 4B, in some embodiments, the online system 102 subsequently may receive a request from an additional user/customer 204 to generate a rendering of the physical retail store 104 in the virtual reality environment or another environment (e.g., an augmented reality environment or a mixed reality environment). The online system 102 may then perform some or all of the steps described above for the additional user/customer 204 in the appropriate environment. For example, the online system 102 may access 415 a user profile of the additional user/customer 204, generate 420 the rendering of the physical retail store 104 based in part on the information describing the physical retail store 104 and the user profile of the additional user/customer 204, and send 425 the rendering for display to the additional user/customer 204.

Figure 6A:
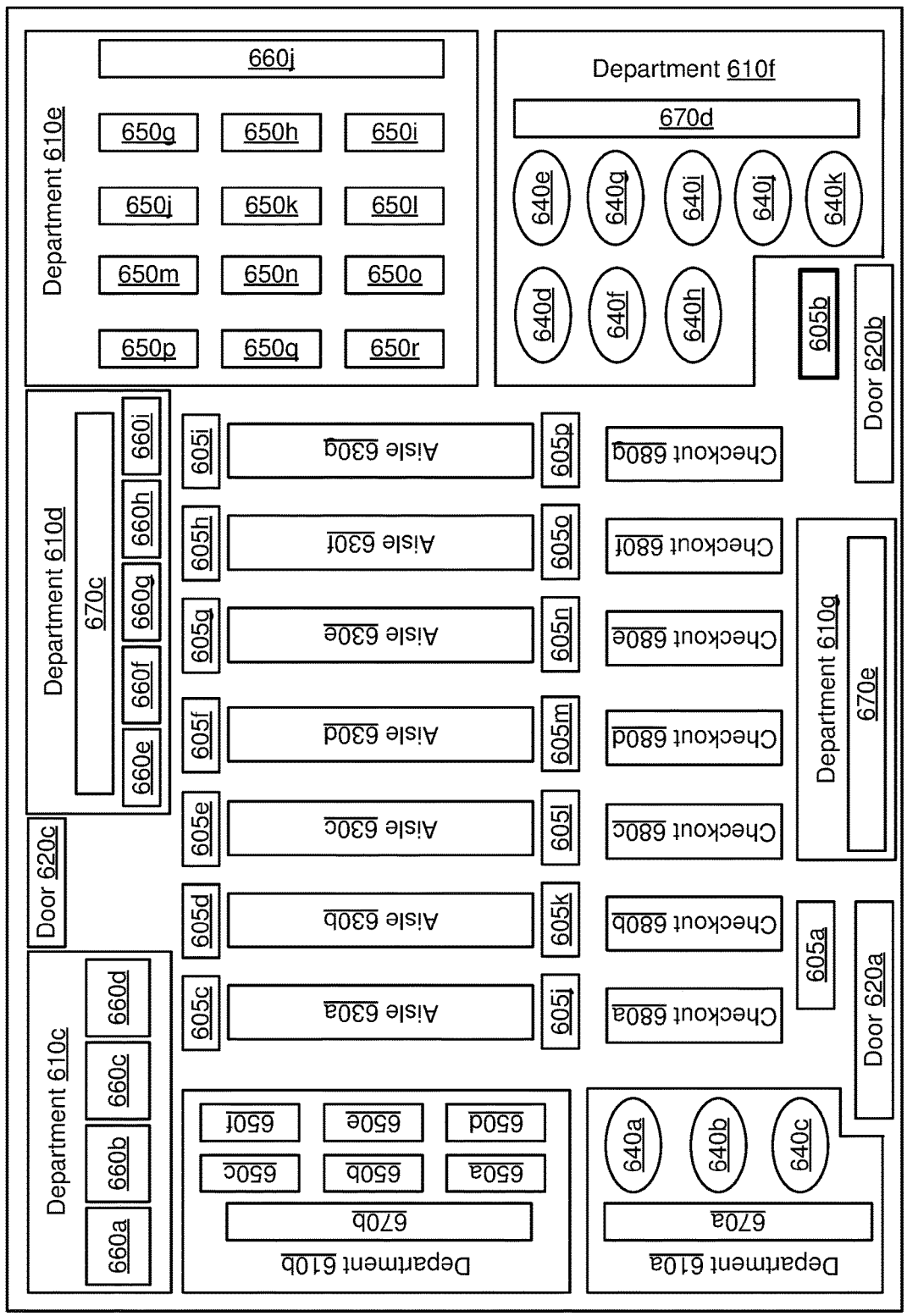
FIG. 6A illustrates a rendering of a physical retail store in a virtual reality environment, in accordance with one or more illustrative aspects of the disclosure.
Figure 6B:
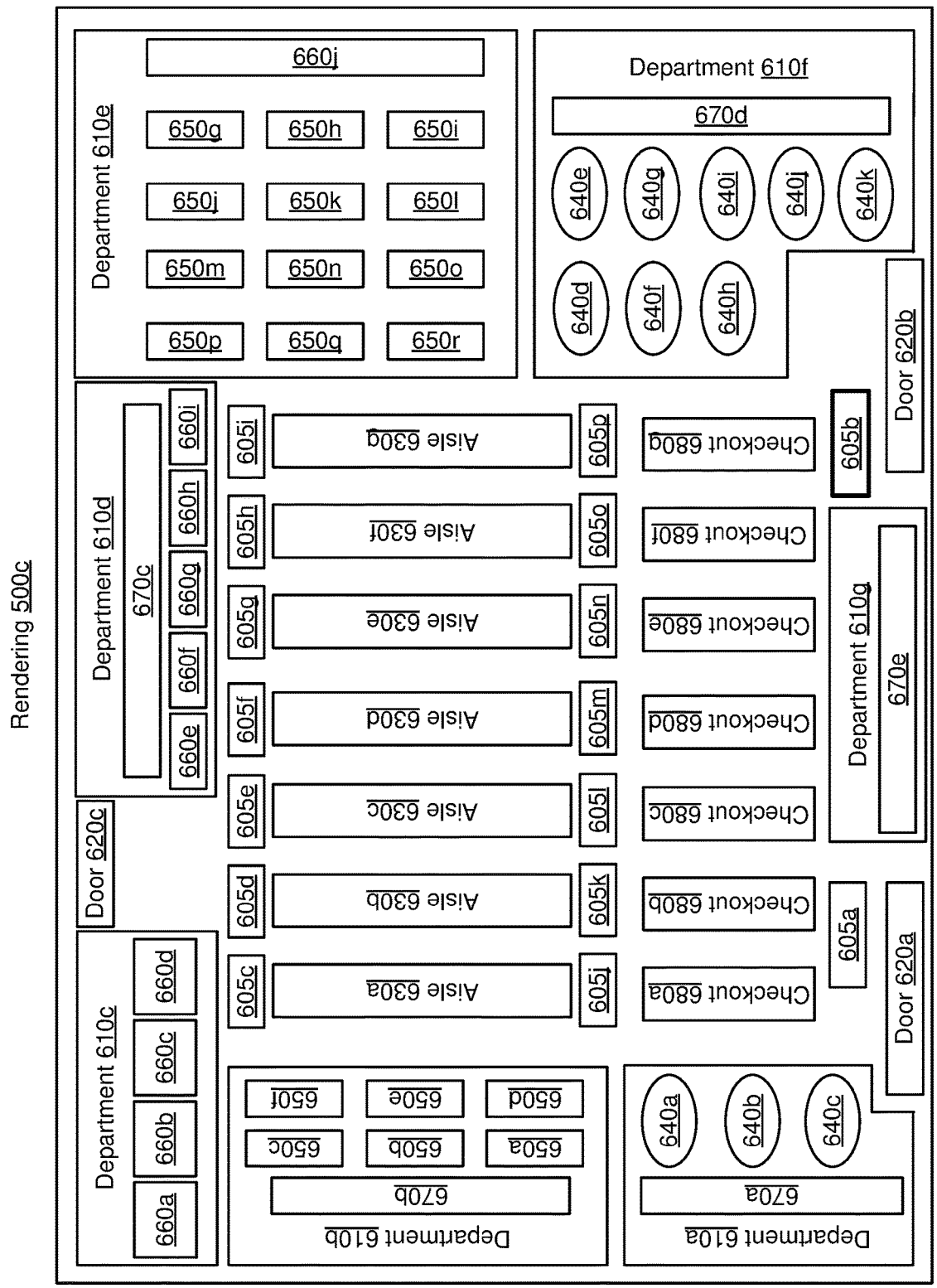
FIG. 6B illustrates a rendering of a physical retail store in a virtual reality environment, in accordance with one or more illustrative aspects of the disclosure.
Figure 6C:
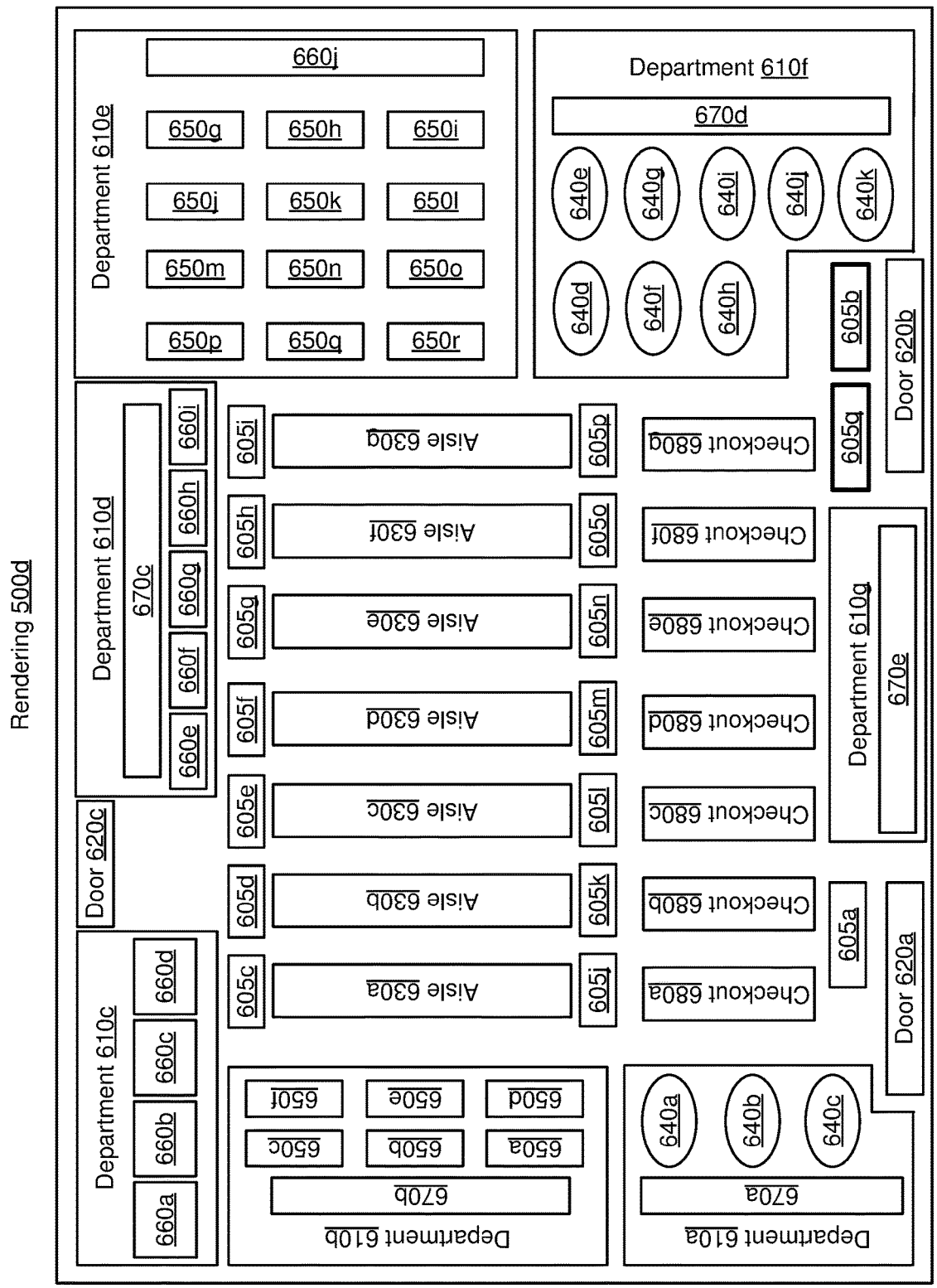
FIG. 6C illustrates a rendering of a physical retail store in a virtual reality environment, in accordance with one or more illustrative aspects of the disclosure.
Figure 6D:
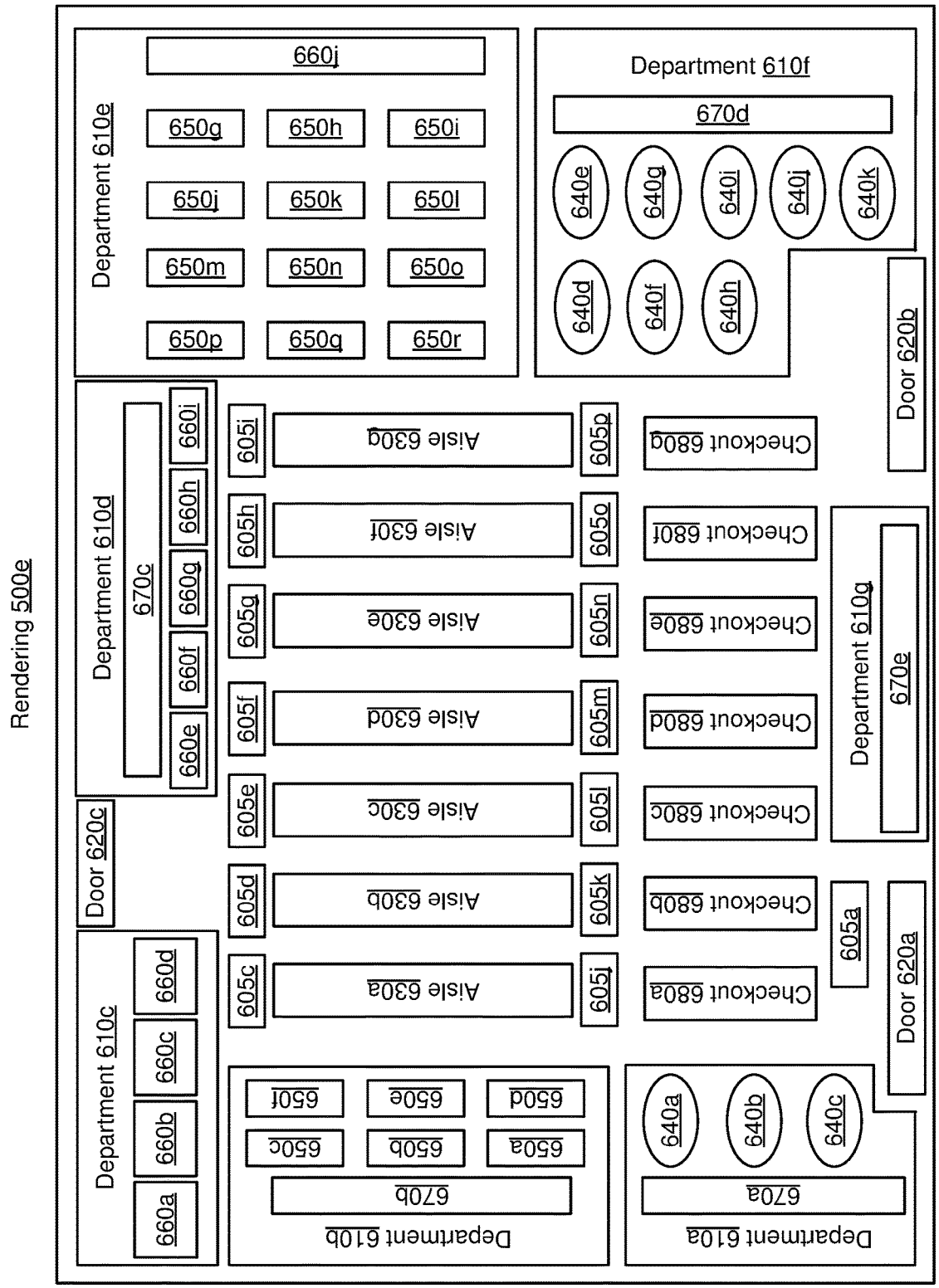
FIG. 6D illustrates a rendering of a physical retail store in a virtual reality environment, in accordance with one or more illustrative aspects of the disclosure.

In some embodiments, the online system 102 may generate (in step 420) different renderings of the physical retail store 104 for different users/customers 204. In such embodiments, the renderings of the physical retail store 104 may differ only with respect to a particular variable (e.g., by adding or removing a virtual reality element within the rendering or by arranging the virtual reality elements differently within the rendering) to perform an A/B test. For example, as shown in FIGS. 6A-6D, which each illustrate a rendering 500 of a physical retail store 104 in a virtual reality environment, in accordance with one or more illustrative aspects of the disclosure, the online system 102 may generate (in step 420) different versions of the rendering 500 of the physical retail store 104 to perform an A/B test. The renderings 500 illustrated in FIGS. 6A-6D are identical with respect to the attributes and arrangements of virtual reality elements representing departments 610, doors 620, aisles 630, refrigerated display cases, 640, display tables 650, frozen display cases 660, service counters 670, and checkout counters 680 and differ only with respect to a virtual reality element representing a promotional display 605. As shown in FIG. 6A, the online system 102 may generate 420 a first version of a rendering 500b of the physical retail store 104, in which a virtual reality element 605b corresponding to a promotional display is located to the right of a user/customer 204 who accesses the rendering via a virtual reality element representing a door 620b. In a second version of the rendering 500c shown in FIG. 6B, the virtual reality element 605b is located to the left of a user/customer 204 who accesses the rendering via the virtual reality element representing the door 620b. Alternatively, in the second version of the rendering, either an additional virtual reality element 605q may be added to the rendering 500d (e.g., to the left of the virtual reality element 605b representing the promotional display), as shown in FIG. 6C, or the virtual reality element 605b may be removed, as shown in the rendering 500d in FIG. 6D.

Additional Considerations

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Some embodiments may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising, at an online system comprising at least one processor and memory:
   receiving data collected via one or more sensors and one or more cameras mounted on a cart at a physical space, the received data including a plurality of times at which the cart passed a plurality of physical elements within the physical space, sensor data for determining a speed at which the cart was moving at the physical space during the plurality of times, and images of the plurality of physical elements;
   determining, based on the received data, information describing the physical space, the information comprising one or more attributes of the plurality of physical elements within the physical space and an arrangement of the plurality of physical elements within the physical space, the arrangement of the plurality of physical elements including dimensions of the plurality of physical elements within the physical space and distances between the plurality of physical elements within the physical space;

determining, using a machine-learned item availability model, a probability of an availability of an item at the physical space and an error score representing a confidence of the availability, wherein the error score is determined based on the data collected via the one or more sensors and the one or more cameras mounted on the cart at the physical space and an indication about whether a prior probability of the availability was correct;

generating a rendering of the physical space in a virtual reality environment based at least in part on the determined information describing the physical space, the determined probability of availability and the error score, wherein the rendering of the physical space comprises a plurality of virtual reality elements representing a set of the plurality of physical elements, and the plurality of virtual reality elements are arranged based at least in part on the arrangement of the plurality of physical elements;

sending the rendering of the physical space for display at a device associated with a user of the online system;

receiving data corresponding to an interaction by the user via the device with one or more of the plurality of virtual reality elements, the interaction including placing the one or more virtual reality elements into a virtual reality element;

receiving an update to the information describing the physical space;

updating the rendering of the physical space based at least in part on the update to the information describing the physical space; and sending the updated rendering of the physical space for display to the user of the online system.

2. The method of claim 1, wherein the plurality of physical elements within the physical space comprises one or more of: an item sold at the physical space, an aisle, a shelf, a display area, a service counter, a dispenser, a sign, a human, an employee at the physical space, the cart, a shopping basket, or a building element.

3. The method of claim 1, wherein the one or more attributes of the plurality of physical elements comprise one or more of: a brand associated with a physical element of the plurality of physical elements, a size of the physical element, a packaging of the physical element, an image associated with the physical element, text associated with the physical element, a price of the physical element, a color of the physical element, a quantity associated with the physical element, a version of the physical element, a dimension of the physical element, or a texture of the physical element.

4. The method of claim 1, further comprising:
receiving information describing one or more interactions of the user of the online system with one or more of the plurality of virtual reality elements in the virtual reality environment; and
communicating the information describing the one or more interactions to an entity associated with the physical space.

5. The method of claim 1, wherein a geographic location associated with the user is within a threshold distance of a geographic location associated with the physical space.

6. The method of claim 1, wherein one or more of a virtual reality element of the plurality of virtual reality elements and the arrangement of the plurality of virtual reality elements is associated with a version of a variable of an A/B test.

7. The method of claim 1, wherein one or more of the information describing the physical space and the update to the information describing the physical space are received by one or more computing systems within the physical space.

8. The method of claim 1, further comprising:
receiving a request from an additional user of the online system to generate an additional rendering of the physical space in the virtual reality environment;
accessing a user profile of the additional user, the user profile comprising information describing a geographic location associated with the additional user and a set of historical actions performed by the additional user, wherein the set of historical actions is associated with one or more of the plurality of physical elements;
generating the additional rendering of the physical space based at least in part on the information describing the physical space and the user profile of the additional user, wherein the additional rendering of the physical space comprises an additional plurality of virtual reality elements representing an additional set of the plurality of physical elements and the additional plurality of virtual reality elements are arranged based at least in part on the arrangement of the plurality of physical elements; and
sending the additional rendering of the physical space for display to the additional user of the online system.

9. A computer program product comprising a non-transitory computer readable storage medium having instructions encoded thereon that, when executed by a processor associated with an online system, cause the processor to:
receive data collected via one or more sensors and one or more cameras mounted on a cart at a physical space, the received data including a plurality of times at which the cart passed a plurality of physical elements within the physical space, sensor data for determining a speed at which the cart was moving at the physical space during the plurality of times, and images of the plurality of physical elements;
determine, based on the received data, information describing the physical space, the information comprising one or more attributes of the plurality of physical elements within the physical space and an arrangement of the plurality of physical elements within the physical space, the arrangement of the plurality of physical elements including dimensions of the plurality of physical elements within the physical space and distances between the plurality of physical elements within the physical space;
determine, using a machine-learned item availability model, a probability of an availability of an item at the physical space and an error score representing a confidence of the availability, wherein the error score is determined based on the data collected via the one or more sensors and the one or more cameras mounted on the cart at the physical space and an indication about whether a prior probability of the availability was correct;
generate a rendering of the physical space in a virtual reality environment based at least in part on the determined information describing the physical space, the determined probability of availability and the error score, wherein the rendering of the physical space comprises a plurality of virtual reality elements representing a set of the plurality of physical elements, and the plurality of virtual reality elements are arranged based at least in part on the arrangement of the plurality of physical elements;

send the rendering of the physical space for display at a device associated with a user of the online system;

receive data corresponding to an interaction by the user via the device with one or more of the plurality of virtual reality elements, the interaction including placing the one or more virtual reality elements into a virtual reality element;

receive an update to the information describing the physical space;

update the rendering of the physical space based at least in part on the update to the information describing the physical space; and send the updated rendering of the physical space for display to the user of the online system.

10. The computer program product of claim 9, wherein the plurality of physical elements within the physical space comprises one or more of:

an item sold at the physical space, an aisle, a shelf, a display area, a service counter, a dispenser, a sign, a human, an employee at the physical space, the cart, a shopping basket, or a building element.

11. The computer program product of claim 9, wherein the one or more attributes of the plurality of physical elements comprise one or more of: a brand associated with a physical element of the plurality of physical elements, a size of the physical element, a packaging of the physical element, an image associated with the physical element, text associated with the physical element, a price of the physical element, a color of the physical element, a quantity associated with the physical element, a version of the physical element, a dimension of the physical element, or a texture of the physical element.

12. The computer program product of claim 9, wherein the computer readable storage medium further has instructions encoded thereon that, when executed by the processor, cause the processor to:

receive information describing one or more interactions of the user of the online system with one or more of the plurality of virtual reality elements in the virtual reality environment; and communicate the information describing the one or more interactions to an entity associated with the physical space.

13. The computer program product of claim 9, wherein a geographic location associated with the user is within a threshold distance of a geographic location associated with the physical space.

14. The computer program product of claim 9, wherein one or more of a virtual reality element of the plurality of virtual reality elements and the arrangement of the plurality of virtual reality elements is associated with a version of a variable of an A/B test.

15. The computer program product of claim 9, wherein one or more of the information describing the physical space and the update to the information describing the physical space are received by one or more computing systems within the physical space.

16. An online system comprising:
at least one processor; and
a memory storing instructions that, when executed by the at least one processor,
cause the online system to:
receive data collected via one or more sensors and one or more cameras mounted on a cart at a physical space, the received data including a plurality of times at which the cart passed a plurality of physical elements within the physical space, sensor data for determining a speed at which the cart was moving at the physical space during the plurality of times, and images of the plurality of physical elements;

determine, based on the received data, information describing the physical space, the information comprising one or more attributes of the plurality of physical elements within the physical space and an arrangement of the plurality of physical elements within the physical space, the arrangement of the plurality of physical elements including dimensions of the plurality of physical elements within the physical space and distances between the plurality of physical elements within the physical space;

determine, using a machine-learned item availability model, a probability of an availability of an item at the physical space and an error score representing a confidence of the availability, wherein the error score is determined based on the data collected via the one or more sensors and the one or more cameras mounted on the cart at the physical space and an indication about whether a prior probability of the availability was correct;

generate a rendering of the physical space in a virtual reality environment based at least in part on the determined information describing the physical space, the determined probability of availability and the error score, wherein the rendering of the physical space comprises a plurality of virtual reality elements representing a set of the plurality of physical elements, and the plurality of virtual reality elements are arranged based at least in part on the arrangement of the plurality of physical elements;

send the rendering of the physical space for display at a device associated with a user of the online system;

receive data corresponding to an interaction by the user via the device with one or more of the plurality of virtual reality elements, the interaction including placing the one or more virtual reality elements into a virtual reality element;

receive an update to the information describing the physical space;

update the rendering of the physical space based at least in part on the update to the information describing the physical space; and send the updated rendering of the physical space for display to the user of the online system.

* * * * *